United States Patent
Lee et al.

(10) Patent No.: US 12,439,408 B2
(45) Date of Patent: Oct. 7, 2025

(54) METHOD OF TRANSMITTING AND RECEIVING DOWNLINK CONTROL CHANNEL AND APPARATUS THEREFOR

(71) Applicant: LG ELECTRONICS INC., Seoul (KR)

(72) Inventors: Sunghoon Lee, Seoul (KR); Jaehyung Kim, Seoul (KR); Seunggye Hwang, Seoul (KR); Youngdae Lee, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 398 days.

(21) Appl. No.: 18/078,288

(22) Filed: Dec. 9, 2022

(65) Prior Publication Data
US 2023/0354328 A1    Nov. 2, 2023

(30) Foreign Application Priority Data
Apr. 28, 2022    (KR) .......................... 10-2022-0053058

(51) Int. Cl.
*H04W 72/1273* (2023.01)
*H04W 24/08* (2009.01)
(Continued)

(52) U.S. Cl.
CPC ....... *H04W 72/1273* (2013.01); *H04W 24/08* (2013.01); *H04W 72/23* (2023.01); *H04W 76/28* (2018.02)

(58) Field of Classification Search
CPC ... H04L 5/0044; H04L 5/0053; H04L 5/0066; H04W 24/08; H04W 52/0229;
(Continued)

(56) References Cited

U.S. PATENT DOCUMENTS

2020/0314811 A1* 10/2020 Lin .................. H04W 52/0216
2023/0018093 A1*  1/2023 Liao .................... H04L 5/0078
(Continued)

OTHER PUBLICATIONS

Li et al., "Enhanced Power Saving Schemes for eXtended Reality", 2021 IEEE 32nd Annual International Symposium on Personal, Indoor and Mobile Radio Communication (PIMRC).
(Continued)

*Primary Examiner* — Awet Haile
(74) *Attorney, Agent, or Firm* — BRYAN CAVE LEIGHTON PAISNER LLP

(57) ABSTRACT

The present disclosure provides a method of receiving a physical downlink shared channel (PDSCH) by a user equipment (UE) in a wireless communication system. The method may include: receiving a parameter related to discontinuous reception (DRX) operation through a higher layer; receiving first downlink control information (DCI) including information related to physical downlink control channel (PDCCH) monitoring adaptation; receiving second DCI for scheduling the PDSCH within a DRX active time of the DRX operation, based on the information related to the PDCCH monitoring adaptation; and receiving the PDSCH based on the second DCI. The PDCCH monitoring adaptation may be determined based on jitter related to the PDSCH.

15 Claims, 16 Drawing Sheets

(51) Int. Cl.
*H04W 72/23* (2023.01)
*H04W 76/28* (2018.01)

(58) Field of Classification Search
CPC ........... H04W 68/025; H04W 72/1273; H04W 72/23; H04W 76/28
See application file for complete search history.

(56) References Cited

U.S. PATENT DOCUMENTS

| | | | |
|---|---|---|---|
| 2024/0022387 A1* | 1/2024 | Li | H04W 52/0235 |
| 2024/0073924 A1* | 2/2024 | Hoshino | H04W 52/0235 |
| 2025/0081288 A1* | 3/2025 | Moon | H04W 52/0216 |

OTHER PUBLICATIONS

Vivo, "Potential enhancement areas for XR", 3GPP TSG RAN WG1 #107-e, e-Meeting, Nov. 11-19, 2021, R1-2111047.

Intel Corporation "Potential enhancement areas for XR," 3GPP TSG RAN WG1 #107-e, R1-2111522, 2 pages, Nov. 2021.

ZTE, Sanechips "On Capacity and Power Working Areas for XR," 3GPP TSG RAN WG1 #106bis-e, R1-2108891, 10 pages, Oct. 2021.

ZTE, Sanechips "Considerations on Capacity and Power Working Areas for XR," 3GPP TSG RAN WG1 #107-e, R1-2111352, 14 pages, Nov. 2021.

* cited by examiner (a)

(b)

METHOD OF TRANSMITTING AND RECEIVING DOWNLINK CONTROL CHANNEL AND APPARATUS THEREFOR

This application claims the benefit of Korean Patent Application No. 10-2022-0053058, filed on Apr. 28, 2022, which is hereby incorporated by reference as if fully set forth herein.

BACKGROUND

Field

The present disclosure relates to a method of transmitting and receiving a downlink control channel and an apparatus therefor, and more particularly, to a method of transmitting and receiving a physical downlink control channel (PDCCH) based on PDCCH monitoring adaptation in consideration of jitter in extended reality (XR) services and apparatus therefor.

Discussion of the Related Art

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

Accordingly, the present disclosure is directed to a method of transmitting and receiving a downlink control channel and apparatus therefor that substantially obviates one or more problems due to limitations and disadvantages of the related art.

An object of the present disclosure is to provide a method of transmitting and receiving a downlink control channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, there is provided a method of receiving a physical downlink shared channel (PDSCH) by a user equipment (UE) in a wireless communication system. The method may include: receiving a parameter related to discontinuous reception (DRX) operation through a higher layer; receiving first downlink control information (DCI) including information related to physical downlink control channel (PDCCH) monitoring adaptation; receiving second DCI for scheduling the PDSCH within a DRX active time of the DRX operation, based on the information related to the PDCCH monitoring adaptation; and receiving the PDSCH based on the second DCI. The PDCCH monitoring adaptation may be determined based on jitter related to the PDSCH.

In this case, the first DCI may be received out of the DRX active time.

Monitoring of the second DCI may be skipped from slot (N+1) to slot (N+n) based on the information related to the PDCCH monitoring adaptation, and the first DCI may be received in slot N, where n may be determined based on the jitter.

Based on the information related to the PDCCH monitoring adaptation, monitoring of the second DCI may be performed (i) in a first duration from slot (M−m) to slot M and a second duration from slot X to slot (X+m) based on a first search space set group (SSSG); and (ii) in a third duration from slot M to slot X based on a second SSSG, where M, X, and m may be determined based on the jitter, and the first SSSG and the second SSSG may have different frequencies of PDCCH monitoring.

The first DCI may further include information for delaying a start of the DRX active time.

The PDSCH may carry a packet for an extended reality (XR) service.

In another aspect of the present disclosure, there is provided a UE configured to receive a PDSCH in a wireless communication system. The UE may include: at least one transceiver; at least one processor; and at least one memory operably connected to the at least one processor and configured to store instructions that, when executed, cause the at least one processor to perform operations. The operations may include: receiving, through the at least one transceiver, a parameter related to DRX operation through a higher layer; receiving, through the at least one transceiver, first DCI including information related to PDCCH monitoring adaptation; receiving, through the at least one transceiver, second DCI for scheduling the PDSCH within a DRX active time of the DRX operation, based on the information related to the PDCCH monitoring adaptation; and receiving, through the at least one transceiver, the PDSCH based on the second DCI. The PDCCH monitoring adaptation may be determined based on jitter related to the PDSCH.

In this case, the first DCI may be received out of the DRX active time.

Monitoring of the second DCI may be skipped from slot (N+1) to slot (N+n) based on the information on the PDCCH monitoring adaptation, and the first DCI may be received in slot N, where n may be determined based on the jitter.

Based on the information related to the PDCCH monitoring adaptation, monitoring of the second DCI may be performed (i) in a first duration from slot (M−m) to slot M and a second duration from slot X to slot (X+m) based on a first search space set group (SSSG); and (ii) in a third duration from slot M to slot X based on a second SSSG, where M, X, and m may be determined based on the jitter, and the first SSSG and the second SSSG may have different frequencies of PDCCH monitoring.

The first DCI may further include information for delaying a start of the DRX active time.

The PDSCH may carry a packet for an XR service.

In another aspect of the present disclosure, there is provided an apparatus configured to receive a PDSCH in a wireless communication system. The apparatus may include: at least one processor; and at least one memory operably connected to the at least one processor and configured to store instructions that, when executed, cause the at least one processor to perform operations. The operations may include: receiving a parameter related to DRX operation through a higher layer; receiving first DCI including information related to PDCCH monitoring adaptation; receiving second DCI for scheduling the PDSCH within a DRX active time of the DRX operation, based on the information related to the PDCCH monitoring adaptation; and receiving the PDSCH based on the second DCI. The PDCCH monitoring adaptation may be determined based on jitter related to the PDSCH.

In another aspect of the present disclosure, there is provided a computer-readable storage medium including at least one computer program that causes at least one processor to perform operations. The operations may include: receiving a parameter related to DRX operation through a higher layer; receiving first DCI including information related to PDCCH monitoring adaptation; receiving second DCI for scheduling the PDSCH within a DRX active time of the DRX operation, based on the information related to the PDCCH monitoring adaptation; and receiving the PDSCH based on the second DCI. The PDCCH monitoring adaptation may be determined based on jitter related to the PDSCH.

In another aspect of the present disclosure, there is provided a method of transmitting a PDSCH by a base station in a wireless communication system. The method may include: transmitting a parameter related to DRX operation through a higher layer; transmitting first DCI including information related to PDCCH monitoring adaptation; transmitting second DCI for scheduling the PDSCH within a DRX active time of the DRX operation, based on the information related to the PDCCH monitoring adaptation; and transmitting the PDSCH based on the second DCI. The PDCCH monitoring adaptation may be determined based on jitter related to the PDSCH.

In a further aspect of the present disclosure, there is provided a base station configured to transmit a PDSCH in a wireless communication system. The base station may include: at least one transceiver; at least one processor; and at least one memory operably connected to the at least one processor and configured to store instructions that, when executed, cause the at least one processor to perform operations. The operations may include: transmitting, through the at least one transceiver, a parameter related to DRX operation through a higher layer; transmitting, through the at least one transceiver, first DCI including information related to PDCCH monitoring adaptation; transmitting, through the at least one transceiver, second DCI for scheduling the PDSCH within a DRX active time of the DRX operation, based on the information related to the PDCCH monitoring adaptation; and transmitting, through the at least one transceiver, the PDSCH based on the second DCI. The PDCCH monitoring adaptation may be determined based on jitter related to the PDSCH.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
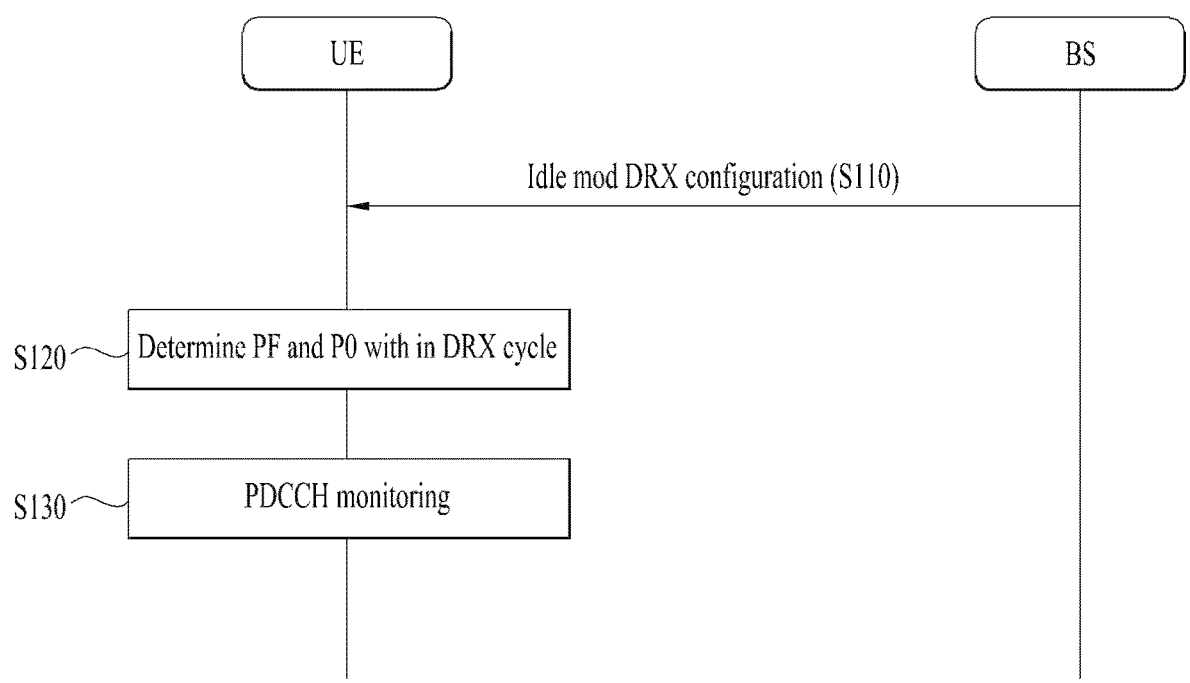
FIGS. 1 and 2 are diagrams for explaining idle mode discontinuous reception (DRX) operation.

Reference will now be made in detail to the preferred embodiments of the present disclosure, examples of which are illustrated in the accompanying drawings. Wherever possible, the same reference numbers will be used throughout the drawings to refer to the same or like parts.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DRX (Discontinuous Reception) Operation

The UE uses Discontinuous Reception (DRX) in RRC_IDLE and RRC_INACTIVE state in order to reduce power consumption. When the DRX is configured, the UE performs a DRX operation according to DRX configuration information. When the UE operates based on the DRX, the UE repeats ON/OFF for reception. For example, when the DRX is configured, the UE attempts to receive/detect the PDCCH (e.g., PDCCH monitoring) only in a predetermined time interval (e.g., ON), and does not attempt to receive the PDCCH in the remaining time period (e.g., OFF/sleep).

At this time, a time period during which the UE should attempt to receive the PDCCH is referred to as an On-duration, and this on-duration is defined once per DRX cycle. The UE can receive DRX configuration information from a gNB through a RRC signaling and operate as the DRX through a reception of the (Long) DRX command MAC CE.

The DRX configuration information may be included in the MAC-CellGroupConfig. The IE MAC-CellGroupConfig is used to configure MAC parameters for a cell group, including DRX.

DRX (Discontinuous Reception) means an operation mode for enabling a UE (User Equipment) to reduce battery consumption so that the UE can receive/monitor a downlink channel discontiguously. That is, a UE configured with DRX can reduce power consumption by receiving a DL signal discontiguously. The DRX operation is performed in a DRX cycle indicative of a time interval in which On Duration is periodically repeated. The DRX cycle includes On Duration and sleep duration (or Opportunity for DRX). The On Duration indicates a time interval in which a UE monitors a PDCCH in order to receive the PDCCH. DRX may be performed in an RRC (Radio Resource Control)_IDLE state (or mode), an RRC_INACTIVE state (or mode), or an RRC_CONNECTED state (or mode). In the RRC_IDLE state and the RRC_INACTIVE state, DRX is used to receive a paging signal discontiguously.

RRC_Idle state: state in which a radio connection (RRC connection) is not established between a base station and a UE.

RRC Inactive state: state in which a radio connection (RRC connection) has been established between a base station and a UE, but a radio connection is inactivated.

RRC_Connected state: state in which a radio connection (RRC connection) has been established between a base station and a UE.

DRX is basically divided into Idle mode DRX, Connected DRX (C-DRX) and extended DRX. DRX applied in the RRC IDLE state is called Idle mode DRX, and DRX applied in the RRC CONNECTED state is called Connected mode DRX (C-DRX).

eDRX (Extended/enhanced DRX) is a mechanism capable of expanding the cycle of Idle mode DRX and C-DRX. In the Idle mode DRX, whether to permit eDRX may be configured based on system information (e.g., SIB1).

The SIB1 may include an eDRX-Allowed parameter. The eDRX-Allowed parameter is a parameter indicating whether Idle mode extended DRX is permitted.

(1) IDLE Mode DRX

In the IDLE mode, the UE may use DRX to reduce power consumption. One paging occasion (PO) may be a time interval (e.g., a slot or a subframe) in which a paging-radio network temporary identifier (P-RNTI) based physical downlink control channel (PDCCH) may be transmitted. The P-RNTI-based PDCCH may address/schedule a paging message. For P-RNTI-based PDCCH transmission, the PO may indicate a first subframe for PDCCH repetition.

One paging frame (PF) is one radio frame which may include one or a plurality of paging occasions. When DRX is used, a UE may be configured to monitor only one PO per DRX cycle. The PF, PO and/or PNB may be determined based on a DRX parameter provided via network signaling (e.g., system information).

Hereafter, 'PDCCH' may refer to MPDCCH, NPDCCH and/or normal PDCCH. Hereafter, 'UE' may refer to MTC UE, BL (Bandwidth reduced Low complexity)/CE (coverage enhanced) UE, NB-IoT UE, Reduced Capability (RedCap) UE, normal UE and/or IAB-MT (mobile termination).

FIG. 1 is a flowchart showing an example of a method of performing an Idle mode DRX operation.

A UE receives, from a base station, Idle mode DRX configuration information through a higher layer signaling (e.g., system information) (S110).

Furthermore, the UE determines a PF (Paging Frame) and a PO (Paging Occasion), for monitoring a physical downlink control channel (e.g., PDCCH) in a paging DRX cycle based on the Idle mode DRX configuration information (S120). In this case, the DRX cycle includes On Duration and sleep duration (or Opportunity for DRX).

Furthermore, the UE monitors a PDCCH in the PO of the determined PF (S130). The UE monitors only one time interval (PO) for each paging DRX cycle. For example, the time interval may be a slot or a subframe.

Additionally, if the UE receives a PDCCH (more exactly, CRC of PDCCH) scrambled by a P-RNTI during On duration (i.e., if paging is detected), the UE may transit to a connected mode and transmit or receive data with the base station.

Figure 2:
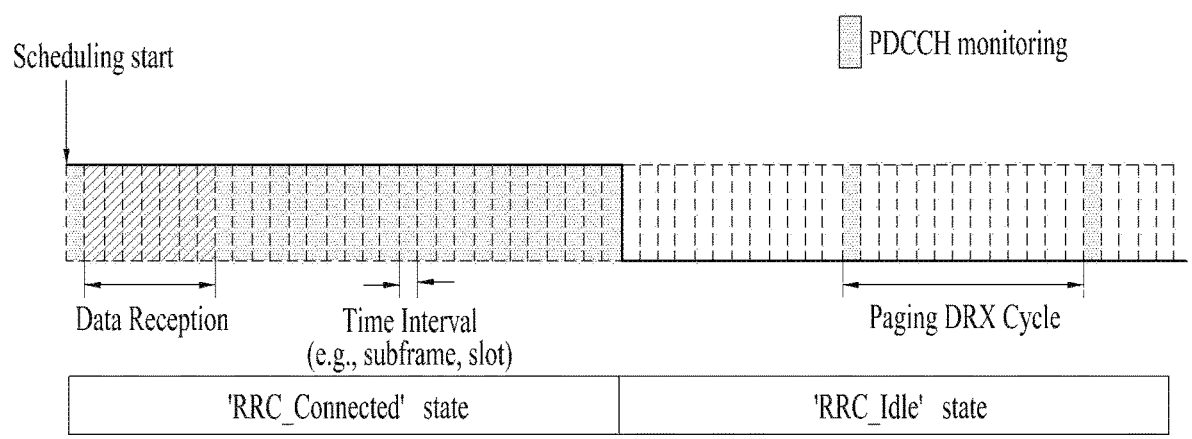

FIG. 2 is a diagram showing an example of an Idle mode DRX operation.

Referring to FIG. 2, if there is a traffic (data) toward a UE in the RRC_Idle state (hereinafter referred to as 'Idle state'), paging occurs toward the corresponding UE.

Thus, the UE wakes up every (paging) DRX cycle and monitors a PDCCH.

If Paging is present, the UE transits to a Connected state, and receives data. Otherwise, the UE may enter a sleep mode again.

(2) Connected Mode DRX (C-DRX)

C-DRX is DRX applied in the RRC Connected state. The DRX cycle of C-DRX may be configured with a Short DRX cycle and/or a Long DRX cycle. The Short DRX cycle is Optional.

If C-DRX is configured, a UE performs PDCCH monitoring for On Duration. If there is a PDCCH successfully detected during the PDCCH monitoring, the UE operates (or runs) an inactivity timer and maintains an awake state. In contrast, if there is no PDCCH successfully detected during the PDCCH monitoring, the UE enters to a sleep state after the On Duration is ended.

If C-DRX is configured, a PDCCH reception occasion (e.g., a slot having a PDCCH search space/candidate) may be configured discontiguously based on a C-DRX configuration. In contrast, if C-DRX is not configured, a PDCCH reception occasion (e.g., a slot having a PDCCH search space/candidate) may be configured contiguously in accordance with PDCCH search space configuration. Meanwhile, PDCCH monitoring may be limited in a time interval configured as a measurement gap, regardless of a C-DRX configuration.

Figure 3:
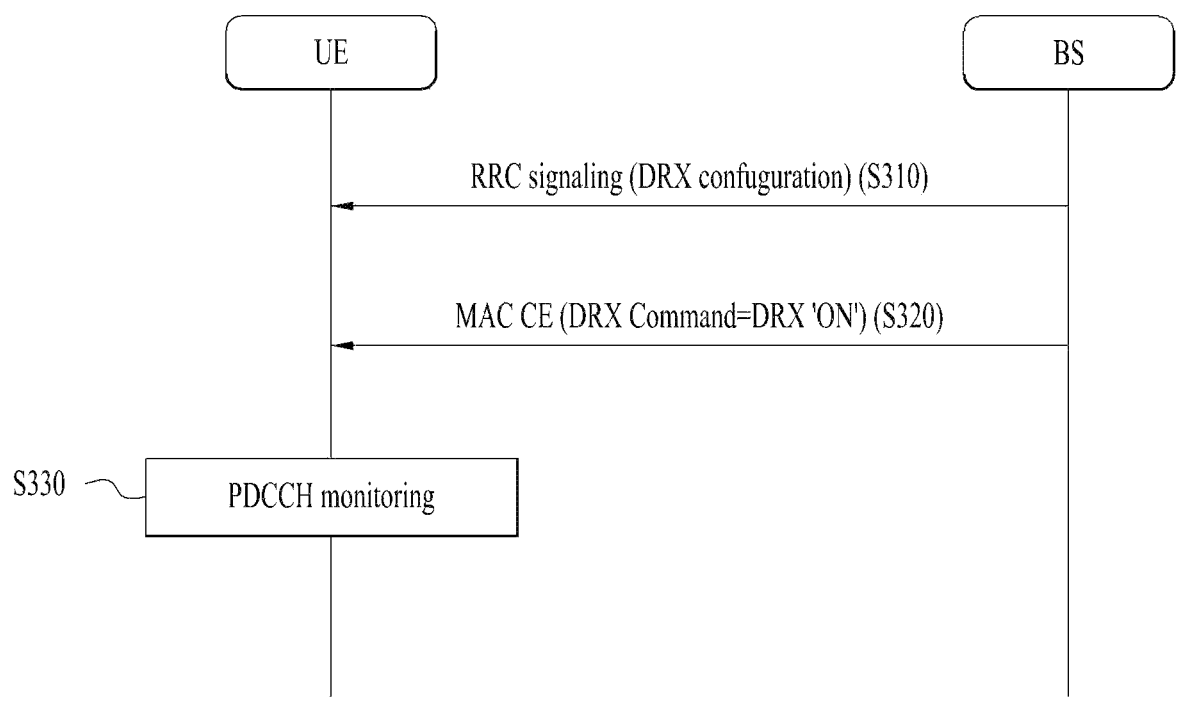
FIGS. 3 to 5 are diagrams for explaining DRX operation in a radio resource control (RRC) connected mode.

FIG. 3 is a flowchart showing an example of a method of performing a C-DRX operation.

A UE receives, from a base station, RRC signalling (e.g., MAC-MainConfig IE) including DRX configuration information (S310). The DRX configuration information may include the following information.

on-duration: the duration that the UE waits for, after waking up, to receive PDCCHs. If the UE successfully decodes a PDCCH, the UE stays awake and starts the drx-inactivity timer;

onDurationTimer: the duration in which the DRX cycle starts. For example, the duration may refer to a time interval to be continuously monitored at the beginning of a DRX cycle, which may be represented in units of milliseconds (ms).

drx-InactivityTimer: the duration after the PDCCH occasion in which a PDCCH indicates a new UL or DL transmission for the MAC entity. For example, the duration may be a time interval represented in units of ms after the UE decodes the PDCCH including scheduling information. That is, the duration refers to a duration in which the UE waits to successfully decode another PDCCH after decoding the PDCCH. If no other PDCCHs are detected within the corresponding duration, the UE transitions to the sleep mode.

The UE restarts the drx-inactivity timer after successfully decoding a PDCCH for initial transmission only except for a PDCCH for retransmission.

drx-RetransmissionTimer: for DL, the maximum duration until a DL retransmission is received; for UL the maximum duration until a grant for UL retransmission is received. For example, for UL, drx-RetransmissionTimer indicates the number of slots in a bandwidth part (BWP) where a transport block (TB) to be retransmitted is transmitted. For DL, drx-RetransmissionTimer indicates the number of slots in a BWP in which a TB to be retransmitted is received.

longDRX-Cycle: On Duration occurrence period drxStartOffset: a subframe number in which a DRX cycle is started drxShortCycleTimer: the duration the UE shall follow the Short DRX cycle;

shortDRX-Cycle: a DRX Cycle operating as much as a drxShortCycleTimer number when Drx-InactivityTimer is terminated drx-SlotOffset: the delay before drx-onDurationTimer starts. For example, the delay may be expressed in units of ms, and more particularly, in multiples of 1/32 ms.

Active time: total duration that the UE monitors PDCCH, which may include (a) the "on-duration" of the DRX cycle, (b) the time UE is performing continuous reception while the drx-inactivity timer has not expired, and (c) the time when the UE is performing continuous reception while waiting for a retransmission opportunity.

Specifically, when the DRX cycle is configured, an active time for a serving cell of a DRX group includes the following.

(a) drx-onDurationTimer or (b) drx-InactivityTimer configured for the DRX group is running; or (c) drx-RetransmissionTimerDL or drx-RetransmissionTimerUL is running on any Serving Cell in the DRX group; or (d) ra-ContentionResolutionTimer or msgB-ResponseWindow is running; or (e) a Scheduling Request is sent on PUCCH and is pending; or (f) a PDCCH indicating a new transmission addressed to the C-RNTI of the MAC entity has not been received after successful reception of a Random Access Response for the Random Access Preamble not selected by the MAC entity among the contention-based Random Access Preamble.

Furthermore, if DRX 'ON' is configured through the DRX command of a MAC CE (command element) (S320), the UE monitors a PDCCH for the ON duration of a DRX cycle based on the DRX configuration (S330).

Figure 4:
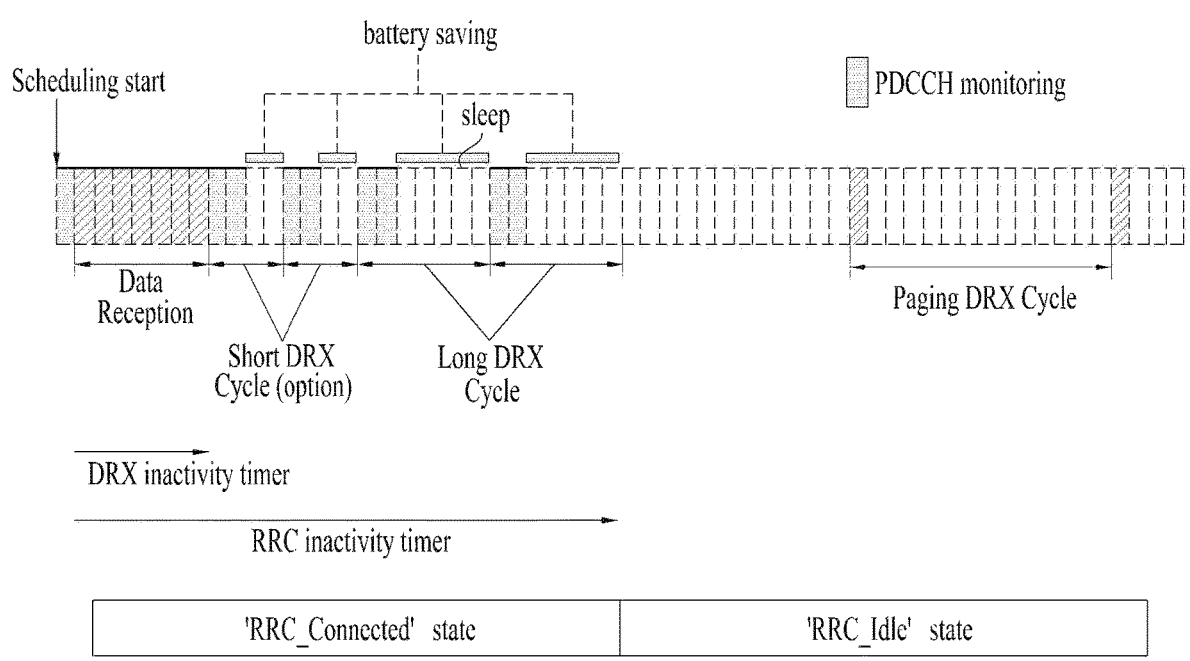

FIG. 4 is a diagram showing an example of a C-DRX operation.

Referring to FIG. 4, when the UE receives scheduling information (e.g., DL assignment or UL grant) in the RRC_Connected state (hereinafter referred to as the connected state), the UE runs a DRX inactivity timer and an RRC inactivity timer.

After the DRX inactivity timer expires, a DRX mode starts. The UE wakes up in a DRX cycle and monitors a PDCCH during a predetermined time (on duration timer).

In this case, if Short DRX is configured, when the UE starts the DRX mode, the UE first starts in a short DRX cycle, and starts to a long DRX cycle after the short DRX cycle is terminated. The Long DRX cycle is a multiple of the short DRX cycle. In the short DRX cycle, the UE wakes up more frequently. After the RRC inactivity timer expires, the UE shifts to an Idle state and performs an Idle mode DRX operation.

Figure 5:
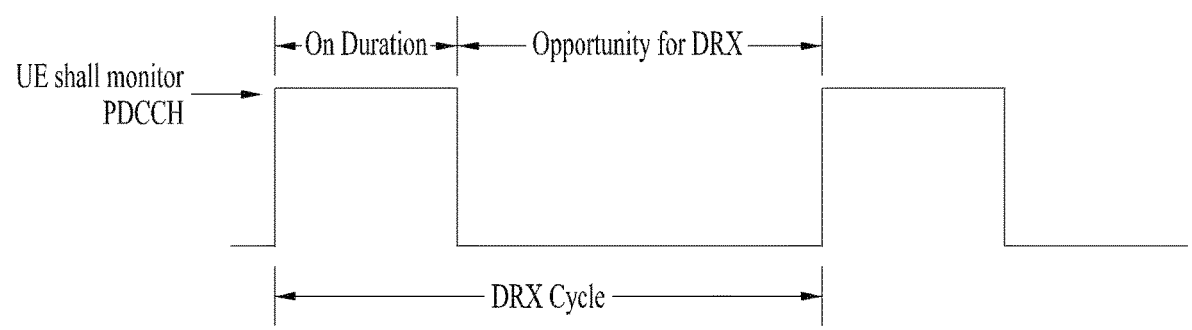

FIG. 5 illustrates a DRX cycle.

The C-DRX operation has been introduced for power saving of the UE. If the UE receives no PDCCH within the on-duration defined for each DRX cycle, the UE enters the sleep mode until the next DRX cycle and does not perform transmission/reception.

On the other hand, when the UE receives a PDCCH within the on-duration, the active time may continue (or increase) based on the operations of an inactivity timer, a retransmission timer, etc. If the UE receives no additional data within the active time, the UE may operate in the sleep mode until the next DRX operation.

In NR, a wake-up signal (WUS) has been introduced to obtain additional power saving gain in addition to the existing C-DRX operation. The WUS may be to inform whether the UE needs to perform PDCCH monitoring within the on-duration of each DRX cycle (or a plurality of DRX cycles). If the UE detects no WUS on a specified or indicated WUS occasion, the UE may maintain the sleep mode without performing PDCCH monitoring in one or more DRX cycles associated with the corresponding WUS.

(3) WUS (DCI Format 2_6)

According to the power saving technology of Rel-16 NR systems, when the DRX operation is performed, it is possible to inform the UE whether the UE needs to wake up for each DRX cycle by DCI format 2_6.

Figure 6:
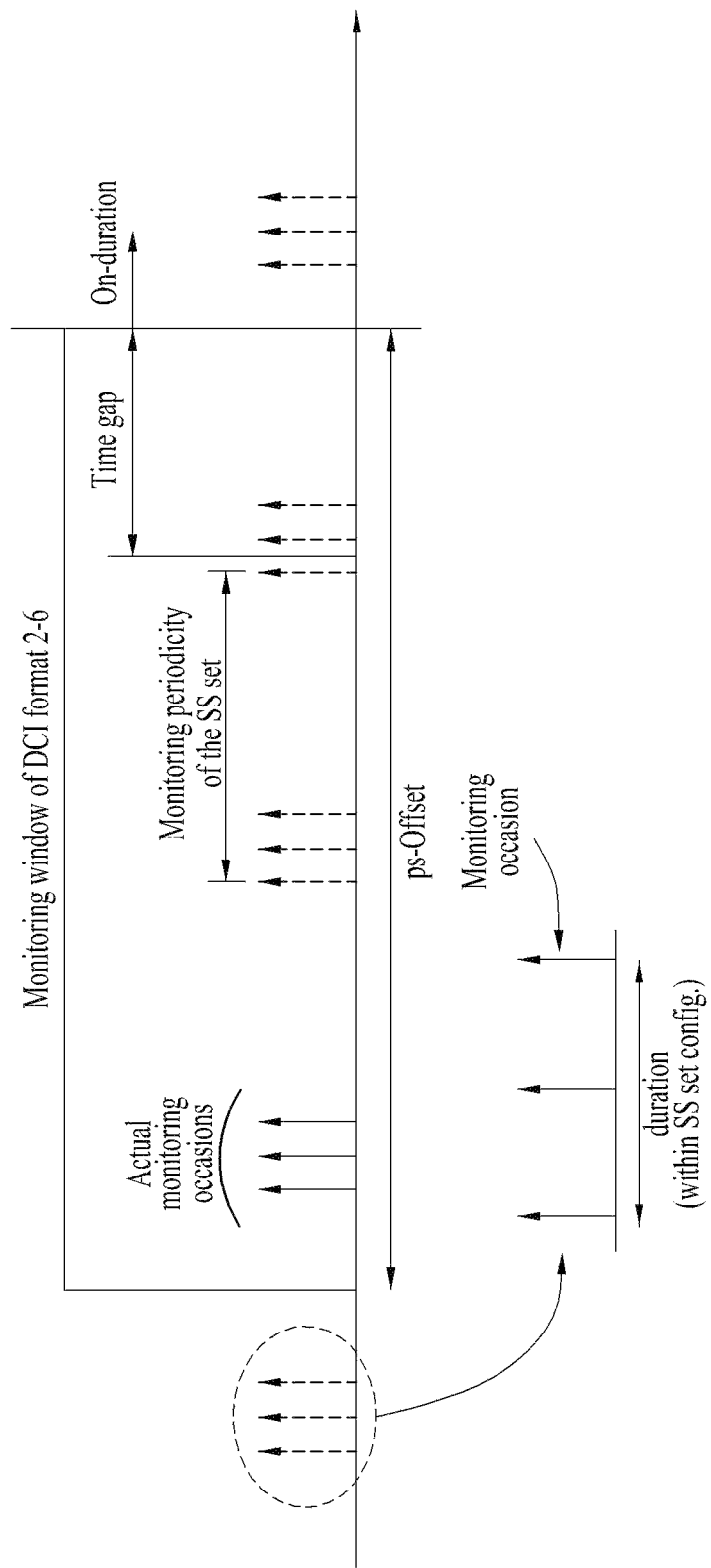
FIG. 6 is a diagram for explaining a method of monitoring DCI format 2_6.

Referring to FIG. 6, a PDCCH monitoring occasion for DCI format 2_6 may be determined by ps-Offset indicated by the network and a time gap reported by the UE. In this case, the time gap reported by the UE may be interpreted as a preparation period necessary for an operation after the UE wakes up.

Referring to FIG. 6, the base station (BS) may provide the UE with a search space (SS) set configuration capable of monitoring DCI format 2_6. According to the corresponding SS set configuration, DCI format 2_6 may be monitored in consecutive slots as long as the duration at the monitoring periodicity interval.

In the DRX configuration, a monitoring window for monitoring DCI format 2_6 may be determined by the start time of the DRX cycle (e.g., a point where the on-duration timer starts) and ps-Offset configured by the BS. In addition, PDCCH monitoring may not be required in the time gap reported by the UE. Consequently, an SS set monitoring occasion on which the UE actually performs monitoring may be determined as a first full duration (i.e., actual monitoring occasions of FIG. 6) within the monitoring window.

If the UE detects DCI format 2_6 in the monitoring window configured based on ps-Offset, the UE may be informed by the BS whether the UE wakes up in the next DRX cycle.

PDCCH Monitoring Adaptation

In NR standards, SS set group switching and PDCCH monitoring skipping have been defined to reduce the power consumption of the UE. The SS set group switching and PDCCH monitoring skipping are collectively defined as PDCCH monitoring adaptation.

(1) SS Set Group Switching

In the current NR standards, the SS set group switching has been defined to reduce the power consumption of the UE. According to the SS set group switching, the UE may be configured with a plurality of SS set groups, and an SS set group to be monitored by the UE among the plurality of SS set groups may be indicated. In addition, the UE may monitor an SS set included in the corresponding SS set group according to the corresponding indication and skip monitoring of SS sets not included in the corresponding SS set group.

For example, the UE may be provided with a list of SS set groups configured with a Type 3-PDCCH common search space (CSS) set and/or a user-specific search space (USS) set. In addition, if a list of SS set groups is provided, the UE may monitor SS sets corresponding to group index #0.

The UE may perform the SS set group switching operation depending on whether SearchSpaceSwitchTrigger is configured.

If SearchSpaceSwitchTrigger is configured for the UE, the UE may switch the SS set group according to the indication of DCI format 2_0.

For example, if the value of an SS Set Group Switching Flag field in DCI format 2_0 is 0, the UE may start monitoring SS set group #0 after a predetermined time from the time when the UE receives DCI format 2_0 and stop monitoring SS set group #1.

If the value of the SS Set Group Switching Flag field in DCI format 2_0 is 1, the UE may start monitoring SS set group #1 after a predetermined time from the time when the UE receives DCI format 2_0 and stop monitoring SS set group #0. If the UE starts monitoring SS set group #1, the UE may start counting a timer configured by SearchSpaceSwitchTimer. If the timer expires, the UE may start monitoring SS set group #0 after a predetermined time from the time when the timer expires and stop monitoring SS set group #1.

If SearchSpaceSwitchTrigger is not configured for the UE, the UE may change the SS set group based on DCI reception. For example, when the UE receives the DCI while monitoring SS set group #0 (or SS set group #1), the UE may start monitoring SS set group #1 (or SS set group #0) after a predetermined time from the time when the UE receives the DCI and stop monitoring SS set group #0 (or SS set group #1). In this case, the UE may start counting the timer configured by SearchSpaceSwitchTimer. If the timer expires, the UE may start monitoring SS set group #0 (or SS set group #1) after a predetermined time from the time when the timer expires and stop monitoring SS set group #1 (or SS set group #0).

The UE may start monitoring SS set group #0 (or SS set group #1) after the predetermined time from the time when the UE receives DCI format 2_0 as described above. In this case, monitoring SS set group #0 (or SS set group #1) after the predetermined time may mean that monitoring of SS set group #0 (or SS set group #1) may start from the first slot (or applicable slot boundary) after at least Pith symbols from the last symbol of the PDCCH including the received DCI. Alternatively, depending on subcarrier spacings, monitoring SS set group #0 (or SS set group #1) after the predetermined time may mean that monitoring of SS set group #0 (or SS set group #1) may start from the first slot in a group of specific slots after at least Pith symbols from the last symbol of the PDCCH including the received DCI. This is because the UE may need a prescribed time to decode the DCI, confirm the SS set group switching indication, and perform the SS set group switching operation actually.

In this case, $P_{switch}$ may be configured by RRC signaling. Based on the smallest subcarrier spacing (SCS) (u) among SCSs of all DL BWPs configured for the capability and serving cell (or a set of serving cell) of the UE, the minimum $P_{switch}$ value may be defined as shown in [Table 1] below.

TABLE 1

| u | Minimum $P_{switch}$ value for UE processing capability 1 [symbols] | Minimum $P_{switch}$ value for UE processing capability 2 [symbols] |
|---|---|---|
| 0 | 25 | 10 |
| 1 | 25 | 12 |
| 2 | 25 | 22 |

(2) PDCCH Monitoring Skipping

In the current NR standards, PDCCH monitoring skipping has been defined to reduce the power consumption of the UE. The UE may be configured with a plurality of PDCCH monitoring skipping durations by an RRC parameter. In this case, the plurality of PDCCH monitoring skipping durations may be configured at the slot level. In addition, any one of the plurality of PDCCH monitoring skipping durations may be indicated to the UE in DCI, and the UE may skip PDCCH monitoring during the corresponding duration. On the other hand, the UE may be instructed not to perform PDCCH monitoring skipping (i.e., no PDCCH monitoring skipping) in the DCI indicating the PDCCH monitoring skipping duration. If PDCCH monitoring skipping for a specific period is indicated by a PDCCH monitoring adaptation field of DCI, the UE may perform the PDCCH monitoring skipping from the beginning of the first slot after the last symbol of PDCCH reception including the corresponding DCI.

(3) Combination of SS Set Group Switching and PDCCH Monitoring Skipping

When the UE is configured with a plurality of SS set groups and a plurality of PDCCH monitoring skipping durations through the RRC layer, and when the UE receives DCI including a PDCCH monitoring adaptation field, the UE may perform SS set group switching or PDCCH monitoring skipping according to the value of the corresponding PDCCH monitoring adaptation field.

For example, depending on whether a plurality of SS set groups are configured and/or whether a plurality of PDCCH monitoring skipping durations are configured, each configurable value of the PDCCH monitoring adaptation field may be mapped to one SS set group or one PDCCH monitoring skipping duration.

When the UE receives the PDCCH monitoring adaptation field, the UE may perform switching to an SS set group corresponding to the corresponding PDCCH monitoring adaptation field value or stop PDCCH monitoring during a PDCCH monitoring skipping duration corresponding to the corresponding PDCCH monitoring adaptation field value.

If the UE receives DCI including a PDCCH monitoring adaptation field indicating PDCCH monitoring skipping in a specific slot, the UE may not expect that a different value from the value of the PDCCH monitoring adaptation field included in the previously received DCI is indicated in the same specific slot.

In addition, if the UE receives DCI including a PDCCH monitoring adaptation field indicating SS set group switching in a specific slot, the UE may not expect that a different value from the value of the PDCCH monitoring adaptation field included in the DCI received in the specific slot is indicated in a slot at least before Pith symbols from the specific slot. That is, the UE may expect that a different value from the value of the PDCCH monitoring adaptation field included in the DCI received in the specific slot is indicated in a slot at least after the $P_{switch}$ symbols from the specific slot.

The embodiments described below may be applied to, for example, extended reality (XR). XR is a concept that encompasses augmented reality (AR), virtual reality (VR), and mixed reality (MR). According to the features of XR, the time when traffic is expected to be received is fixed by frame per second (FPS), and due to the effect of jitter, the expected reception time may be delayed or advanced. The jitter of XR traffic appears as a truncated Gaussian probability distribution. Therefore, the power saving effect may be expected by periodically configuring DRX according to FPS. In addition, if PDCCH monitoring adaptation is configured even though the DRX is not configured, the power saving effect may be expected only by the PDCCH monitoring adaptation. The power saving effect may be expected by configuring both the DRX and PDCCH monitoring adaptation.

The expected time of receiving traffic and the expected time of receiving in consideration of the effect of jitter may be expressed as a probability, and the following embodiments are applicable to achieve the power saving effect in the XR environment as described above.

As an example, as the probability of jitter decreases at a point in time that is relatively far from the expected time of receiving traffic, the reception probability decreases. Thus, the UE may sparsely monitor a PDCCH for power saving. On the other hand, as the probability of jitter increases at a point in time close to the expected time of receiving traffic, the reception probability increases. The UE may densely monitor the PDCCH to adjust the power consumption depending on the reception probability. To this end, an SS set group including SS sets for dense PDCCH monitoring may be set to SS set group #0, and an SS set group including SS sets for sparse PDCCH monitoring may be set to SS set group #1. In other words, the SS set group switching operation may be configured for XR in consideration of jitter.

As another example, the UE may perform PDCCH monitoring during a short period with a high probability of receiving traffic due to a high probability of jitter and then repeat a micro-sleep operation. Accordingly, when the UE does not normally receive traffic, the UE may expect the power saving effect by performing the micro-sleep operation quickly. Then, the UE may perform PDCCH monitoring to receive retransmitted traffic, thereby increasing the efficiency of the PDCCH monitoring. In other words, the PDCCH monitoring skipping operation may be configured for XR in consideration of jitter.

In Rel-18 NR standards, various scenarios and candidate technologies are being discussed to support XR services (e.g., FS_NR_XR_enh). In general, the XR service need to satisfy the following requirements: high data rate and low latency. In addition, since it is expected that the UE consumes high power, various techniques for power saving are being considered. To this end, the DRX operation used to reduce the power consumption of the UE may be considered in the conventional NR standards.

The DRX used to reduce unnecessary power consumption of the UE in NR has the following features. A DRX structure for the UE in the RRC_IDLE state and a DRX structure for the UE in the RRC_CONNECTED state are defined separately. The two DRX structures are designed such that a duration in which the UE expects to receive a DL signal is periodically generated, thereby reducing unnecessary power consumption in other durations. In particular, for C-DRX (e.g., DRX applied to the UE in the RRC_CONNECTED state), the start position of the on-duration is periodically generated according to NR Rel-16 standards.

In this case, the size of the configurable cycle (e.g., DRX cycle) may be determined by a higher layer parameter provided by the BS to the UE. The traffic model and requirements of XR services are defined in 3GPP TR 38.838, which is the technical report of Rel-17 XR study. For the XR service, 60 FPS is generally required, and in some cases, 120 FPS is required. A frame in the XR traffic model may be understood to be the same as a packet received in communication environments. On the other hand, jitter may occur due to various causes, in addition to periodic occurrence of traffic. H, jitter may mean that a packet is received earlier or later than a packet reception time at which actual packet reception is expected.

In the traffic model of the XR service, it is assumed that jitter appears based on the truncated Gaussian distribution. For example, assuming that the periodic packet reception time is T, the range in which a packet is capable of actually being received is given by [T−4, T+4]. The closer to the time T, the higher the packet reception probability, and the farther from the time T, the lower the packet reception probability. In this case, the jitter range is [−4, 4], which may be the range generally assumed in a single stream DL traffic model. Therefore, it is necessary to design a system in consideration of jitter as well as periodic traffic transmission/reception in order to achieve the power saving effect based on the DRX operation in the XR service.

When a DRX structure is configured in consideration of XR service traffic, it may be considered to configure a sufficiently long period for PDCCH monitoring (e.g., drx-onDurationTimer) in order to guarantee reception of generated traffic at every DRX cycle in consideration of the jitter effect. However, if the period in which the UE monitors a PDCCH increases regardless of whether actual traffic occurs or not, the average power consumption of the UE may increase. Accordingly, a method of receiving traffic in consideration of jitter while reducing power consumption due to PDCCH monitoring of the UE will be described in the present disclosure.

Although the present disclosure is described in the context of XR services, the proposed method may be applied to any communication services where periodic transmission is scheduled.

The present disclosure proposes a method of indicating and configuring DCI-based monitoring adaptation within the DRX active time discussed in Rel-17 in addition to the DRX operation to reduce power consumption in XR services.

The UE may be configured with a maximum of 10 SS sets for each BWP. In addition, the UE may monitor PDCCH candidates included in the SS sets (hereinafter, SS set monitoring).

Since the UE needs to perform blind decoding (BD) for a PDCCH whose reception time and DCI format are unknown, the UE may consume much power for PDCCH monitoring during the DRX operation.

It has been agreed to introduce PDCCH monitoring adaptation for adjusting the number of times that the UE performs PDCCH monitoring to reduce the power consumption of the UE within the DRX active time. That is, the PDCCH monitoring adaptation may mean an operation for reducing the number of times of PDCCH monitoring.

As an example of the PDCCH monitoring adaptation, PDCCH monitoring skipping (hereinafter, skipping) and SS set group switching (hereinafter, switching) are considered. The PDCCH monitoring skipping means stopping PDCCH monitoring for a predetermined duration (e.g., PDCCH monitoring skipping duration). The search space set group (SSSG) switching means dividing configured SS sets into a plurality of groups, indicating switching to one group among the plurality of groups according to the purpose of use, and then monitoring SS sets included in the corresponding group.

In the present disclosure, for convenience of description, SSSGs are divided into SSSG #0 and SSSG #1. Here, SSSG #0 refers to an SSSG including a relatively large number of SS sets or an SSSG including SS sets with relatively short periods in order to increase the number of times of PDCCH monitoring when the amount of expected data transmission is large. SSSG #1 is an SSSG including a relatively small number of SS sets or an SSSG including SS sets with relatively long periods in order to reduce the number of times of PDCCH monitoring for power saving, That is, SSSG Switching means that the UE stops monitoring SS sets currently included in a specific SSSG and starts monitoring of SS sets included in other SSSGs.

The present disclosure proposes a method of transmitting and receiving a DCI-based PDCCH monitoring adaptation indication to reduce power consumption of the UE due to PDCCH monitoring when DRX is configured in consideration of the effect of jitter.

In other words, it is possible to reduce power consumption due to unnecessary PDCCH monitoring by instructing the UE to adjust the number of times of PDCCH monitoring through DCI transmission/reception when the UE is configured with a DRX cycle in consideration of the effect of jitter. For example, in addition to scheduling DCI, DCI format 2_6 available as the wake-up indication signal (WUS) of a DRX cycle may be included in DCI capable of indicating the methods proposed in the present disclosure. In addition, the methods proposed in the present disclosure may be indicated in non-scheduling DCI that has not been used in the prior art and new DCI introduced for the proposed methods.

Hereinafter, the methods proposed in the present disclosure are based on C-DRX applied to the UE in the RRC_CONNECTED state, but the present disclosure is not limited thereto. For example, it may be understood by those skilled in the art that a prescribed period in which the UE does not need to expect reception of a DL signal may be extended and applied to other methods defined with a periodicity (e.g., DRX applied to the UE in the RRC_IDLE state).

Thus, it is obvious that unless specified otherwise, the methods proposed in the present disclosure may be applied to all types of transmission/reception methods expected by the BS and the UE as long as the principles of the present disclosure are not violated. In this document, the term DRX is used as a general concept including the term C-DRX for description of convenience.

In addition, the present disclosure is described based on the NR system to explain the principles of the present disclosure, but the proposed methods are not limited to specific NR transmission/reception unless otherwise specified. Although the present disclosure is described based on the characteristics and structure of a UE supporting C-DRX to explain the principles of the present disclosure, the proposed methods are not specifically limited to the UE supporting C-DRX unless otherwise specified. Accordingly, it is obvious that unless specified otherwise, the methods proposed in the present disclosure are applicable to all structures and services for wireless communication transmission/reception as long as the principles of the present disclosure are not violated.

In the following description, each method or option may be intended to clarify the description, and it is not to be construed as implying that each method or option needs to be practiced independently. For example, each of the methods/options described below may be implemented separately, but at least some of the methods/options may be implemented in combination as long as the methods/options do not conflict with each other.

In the methods proposed in the present disclosure and descriptions thereof, a packet may mean a packet for XR services unless specified otherwise. The packet in the present disclosure may be a PDSCH related to traffic or a TB transmitted for the XR service.

Figure 7:
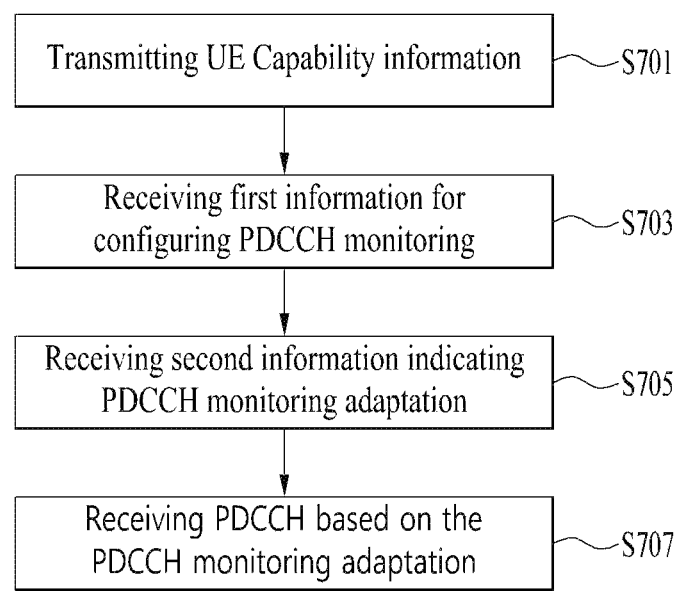
FIGS. 7, 8 and 9 are a diagram for explaining the overall operation processes of a UE and a BS according to an embodiment of the present disclosure.
Figure 8:
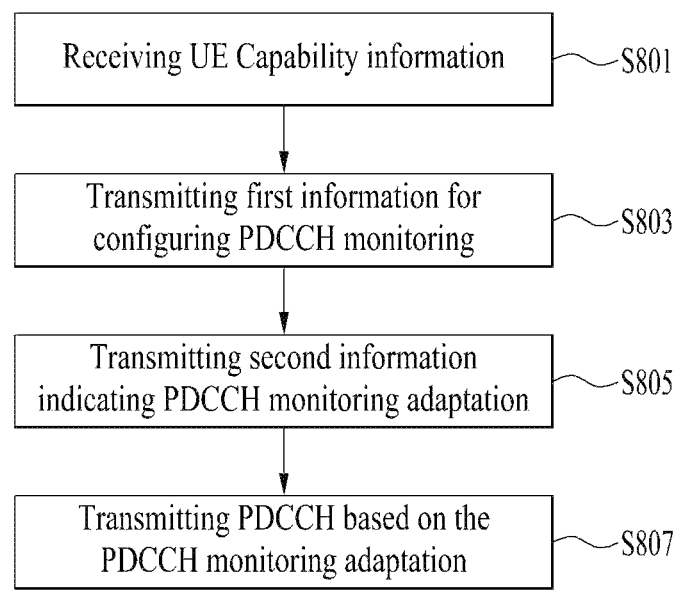
Figure 9:
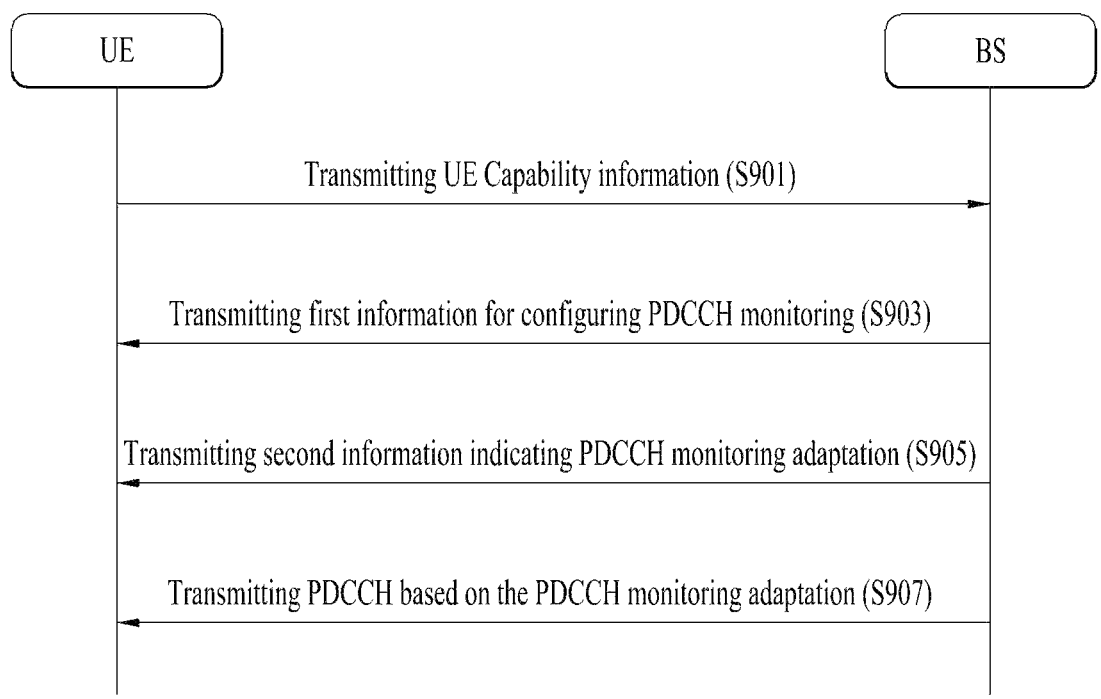

With reference to FIGS. 7 to 9, the overall operation processes of the UE and BS according to the proposed methods of the present disclosure will be described.

FIG. 7 is a diagram for explaining the overall operation process of the UE according to the proposed methods of the present disclosure.

Referring to FIG. 7, the UE may transmit capability information to the BS to support the operations proposed in the present disclosure (S701). For example, the capability information may include information on PDCCH monitoring adaptation (e.g., PDCCH monitoring skipping and SSSG switching) and information on whether delay is supported. However, S701 may be omitted in a specific situation (e.g., when the BS already has the corresponding information or when each operation changes as needed by the BS). Alternatively, S701 may be omitted when the corresponding process is not required.

The UE may receive first information for configuring PDCCH monitoring, which is transmitted by the BS, to support the operations proposed in the present disclosure (S703). For example, the first information may be received in a higher layer signal (e.g., system information block (SIB) or RRC signaling). For example, the first information may be to configure PDCCH monitoring adaptation or configure DCI monitoring in a PDCCH monitoring adaptation duration. In addition, the first information may be related to DRX and delay. Further, the first information may be configured in consideration of UE capability and/or XR service support. For example, the first information may be to configure operations according to at least one of [Method 1] to [Method 3].

The UE may receive second information indicating the PDCCH monitoring adaptation and/or delay based on the first information configured by the higher layer signal (S705). For example, the second information may be included in DCI. In addition, the corresponding DCI may be included in a PDCCH. For example, the PDCCH monitoring adaptation and/or delay indicated by the second information may be based on at least one of [Method 1] to [Method 3].

The UE may receive the PDCCH based on the second information (S707). For example, the UE may perform the PDCCH monitoring adaptation and/or delay indicated by the second information. Accordingly, the UE may reduce the number of times of unnecessary PDCCH monitoring while normally receiving a scheduled packet, thereby reducing power consumption.

For example, the operations of the UE according to S703 to S707 described above may be based on at least one of [Method 1] to [Method 3].

FIG. 8 is a diagram for explaining the overall operation process of the BS according to the proposed methods of the present disclosure.

Referring to FIG. 8, the BS may receive capability information from the UE to support the operations proposed in the present disclosure (S801). For example, the capability information may include information on PDCCH monitoring adaptation (e.g., PDCCH monitoring skipping and SSSG switching) and information on whether delay is supported. However, S801 may be omitted in a specific situation (e.g., when the BS already has the corresponding information or when each operation changes as needed by the BS). Alternatively, S801 may be omitted when the corresponding process is not required.

The BS may transmit first information for configuring PDCCH monitoring to support the operations proposed in the present disclosure (S803). For example, the first information may be transmitted in a higher layer signal (e.g., SIB or RRC signaling). For example, the first information may be to configure PDCCH monitoring adaptation or configure DCI monitoring in a PDCCH monitoring adaptation duration. In addition, the first information may be related to DRX and delay. Further, the first information may be configured in consideration of UE capability and/or XR service support. For example, the first information may be to configure operations according to at least one of [Method 1] to [Method 3].

The BS may transmit second information indicating the PDCCH monitoring adaptation and/or delay based on the first information configured by the higher layer signal (S805). For example, the second information may be included in DCI. In addition, the corresponding DCI may be included in a PDCCH. For example, the PDCCH monitoring adaptation and/or delay indicated by the second information may be based on at least one of [Method 1] to [Method 3].

The BS may transmit the PDCCH based on the second information (S807). For example, the BS may transmit the PDCCH based on the PDCCH monitoring adaptation and/or delay indicated by the second information.

For example, the operations of the BS according to S803 to S807 described above may be based on at least one of [Method 1] to [Method 3].

FIG. 9 is a diagram for explaining an overall operation process of a network according to the proposed methods of the present disclosure.

Referring to FIG. 9, the UE may transmit capability information to the BS to support the operations proposed in the present disclosure (S901). For example, the capability information may include information on PDCCH monitoring adaptation (e.g., PDCCH monitoring skipping and SSSG switching) and information on whether delay is supported. However, S901 may be omitted in a specific situation (e.g., when the BS already has the corresponding information or when each operation changes as needed by the BS). Alternatively, S901 may be omitted when the corresponding process is not required.

The BS may transmit to the UE first information for configuring PDCCH monitoring to support the operations proposed in the present disclosure (S903). For example, the first information may be transmitted in a higher layer signal (e.g., SIB or RRC signaling). For example, the first information may be to configure PDCCH monitoring adaptation or configure DCI monitoring in a PDCCH monitoring adaptation duration. In addition, the first information may be related to DRX and delay. Further, the first information may be configured in consideration of UE capability and/or XR service support. For example, the first information may be to configure operations according to at least one of [Method 1] to [Method 3].

The BS may transmit to the UE second information indicating the PDCCH monitoring adaptation and/or delay based on the first information configured by the higher layer signal (S905). For example, the second information may be included in DCI. In addition, the corresponding DCI may be included in a PDCCH. For example, the PDCCH monitoring adaptation and/or delay indicated by the second information may be based on at least one of [Method 1] to [Method 3].

The BS may transmit the PDCCH based on the second information (S907). For example, the BS may transmit the PDCCH based on the PDCCH monitoring adaptation and/or delay indicated by the second information. The UE may receive the PDCCH based on the second information. For example, the UE may perform the PDCCH monitoring adaptation and/or delay indicated by the second information. Accordingly, the UE may reduce the number of times of unnecessary PDCCH monitoring while normally receiving a scheduled packet, thereby reducing power consumption.

For example, the operations of the UE according to S903 to S907 described above may be based on at least one of [Method 1] to [Method 3].

[Method 1] DCI Format for Indicating PDCCH Monitoring Adaptation

According to Rel-17 NR standards, PDCCH monitoring adaptation in the DRX active time may be indicated by scheduling DCI. If the UE is provided with the PDCCH monitoring adaptation in other DCI as well as the scheduling DCI in consideration of XR services, the power saving effect may be further improved. Therefore, the present disclosure proposes a method in which the BS indicates PDCCH monitoring adaptation to the UE supporting XR in scheduling DCI, DCI format 2_6, or new DCI.

[Method 1-1] Scheduling DCI in DRX Active Time

When the UE is configured with DRX, the UE may monitor a PDCCH within the DRX active time and monitor DCI format 2_6 within a limited duration, which is out of the DRX active time. On the other hand, scheduling DCI includes a 2-bit PDCCH monitoring adaptation indication field. Accordingly, SSSG switching or PDCCH monitoring skipping may be indicated within the DRX active time.

Therefore, even when DRX is configured in consideration of XR traffic, PDCCH monitoring adaptation may be indicated in the same way. In addition, an operation of terminating the current DRX cycle may be included in a PDCCH monitoring skipping duration.

Alternatively, an operation of indirectly terminating the current DRX cycle may be included in consideration of the indicated PDCCH monitoring skipping duration and the remaining time of a running DRX timer (e.g., drx-onDurationTimer and/or drx-InactivityTimer).

For example, if the end of the PDCCH monitoring skipping duration is after the end of the DRX active time, or if the end of the PDCCH monitoring skipping duration is the same as the end of the DRX active time, the UE may terminate the current DRX cycle.

[Method 1-2] WUS (e.g., DCI format 2_6)

The UE may be configured to monitor DCI format 2_6 only in a predetermined duration before the start of the DRX cycle to indicate whether the UE wakes up in the next DRX cycle. The above-described predetermined duration for monitoring DCI format 2_6 is referred to as a WUS monitoring window. In the corresponding WUS monitoring window, only DCI format 2_6 may be monitored with a power saving radio network temporary identifier (PS-RNTI).

According to the current NR standards, DCI format 2_6 including a WUS consists of a wake-up indication and an SCell dormancy indication. In addition, a PDCCH monitoring adaptation indication may be added to apply the proposed methods of the present disclosure. The PDCCH monitoring adaptation indication field of a WUS may consist of a maximum of 2 bits in the same way as the PDCCH monitoring adaptation indication field of scheduling DCI in the Rel-17 NR standards. However, the PDCCH monitoring adaptation indication field of the WUS may consist of more than 2 bits.

However, when DCI format 2_6 of the conventional NR standards is used, it may be desirable to set the field to 1 bit to keep the DCI size as small as possible. A candidate PDCCH monitoring skipping duration value (hereinafter, 'T_WUS') that may be indicated/configured by a WUS may be determined according to at least one of the following three methods.

(1) T_WUS is set to one or more values among PDCCH monitoring skipping duration values configured for the UE.

The UE may be configured with a maximum of three PDCCH monitoring skipping duration values for PDCCH monitoring skipping. In this case, the UE may be configured with the maximum of three PDCCH monitoring skipping duration values through an RRC parameter, PDCCHSkippingDurationList. T_WUS may be set to at least one of values given by PDCCHSkippingDurationList. In other words, at least one of the durations configured for Rel-17 PDCCH monitoring skipping may be set to T_WUS.

(2) T_WUS may be set to a new value other than the PDCCH monitoring skipping duration values configured for the UE, or T_WUS may be set to a separate value that is not configured by PDCCHShippingDurationList.

(3) If T_WUS is not separately configured, one of the PDCCH monitoring skipping duration values configured for the UE may be automatically set to the value of T_WUS.

If the UE is not configured explicitly with any values related to T_WUS, some values in PDCCHSkippingDurationList may be automatically determined as T_WUS values. Alternatively, configured PDCCH monitoring skipping duration values may be prioritized, and T_WUS values may be determined in order of priority according to the number of values capable of being set to T_WUS.

A PDCCH monitoring adaptation indication included in DCI format 2_6 may be configured independently of a PDCCH monitoring adaptation indication in scheduling DCI. Since DCI format 2_6 is monitored out of the DRX active time and scheduling DCI is monitored within the DRX active time, it may be more effective to configure the PDCCH monitoring adaptation indications differently.

For example, when the BS indicates PDCCH monitoring adaptation out of the DRX active time based on the expected amount of traffic in DCI format 2_6, if the amount of traffic to be transmitted within the DRX active time is greater or less than the expected amount of traffic out of the DRX active time after the DRX active time starts, the BS may indicate additional PDCCH monitoring adaptation in scheduling DCI, thereby efficiently controlling the PDCCH monitoring adaptation depending on a change in the amount of traffic.

The PDCCH monitoring adaptation indication in the scheduling DCI may be the same as in the prior art. However, PDCCH monitoring adaptation based on a WUS (e.g., DCI format 2_6) needs to be configured in consideration of the fact that the PDCCH monitoring adaptation is indicated out of the DRX active time. For example, an application delay may be changed. In the Rel-17 standards, the application delay, which is the time from DCI reception to application of PDCCH monitoring skipping, is defined as the first symbol of a slot immediately after a slot in which DCI (e.g., scheduling DCI) is received.

However, if the PDCCH monitoring skipping is indicated by the WUS (e.g., DCI format 2_6), a new application delay needs to be defined. For example, when the PDCCH monitoring skipping is indicated by the WUS (e.g., DCI format 2_6), the application delay may be defined such that the application delay starts after drx-onDurationTimer. Alternatively, after starting drx-onDurationTimer, the UE may apply the PDCCH monitoring skipping from the first symbol of a slot immediately after a slot in which a first PDCCH is received.

Details of the PDCCH monitoring adaptation indicated in DCI format 2_6 may vary. For example, when the PDCCH monitoring skipping is indicated by DCI format 2_6, extra durations may be indicated, except for a maximum of three PDCCH monitoring skipping durations indicated by scheduling DCI. Alternatively, the PDCCH monitoring skipping duration of the PDCCH monitoring skipping indicated by scheduling DCI may be configured at the slot level, whereas the PDCCH monitoring skipping duration of the PDCCH monitoring skipping indicated by DCI format 2_6 may be configured in units of ms. Alternatively, the PDCCH monitoring skipping duration may be configured in association with the DRX timer, similarly to the fact that the PDCCH monitoring skipping is applied during a prescribed percentage of drx-onDurationTimer or drx-InactivityTimer.

On the other hand, the wake-up indication and SCell dormancy indication fields of DCI format 2_6 may not be configured. For example, considering that XR traffic is always transmitted periodically and the DRX cycle is configured in consideration of that of the XR traffic, the UE may need to always wake up at every DRX cycle. Therefore, no separate wake-up indication may be required.

In addition, since XR traffic requires a fixed data rate depending on traffic models, packets of similar sizes may always be received. Thus, no SCell dormancy indication may be required. Accordingly, according to the conventional NR standards, the PDCCH monitoring adaptation may be indicated by the WUS without changing the size of DCI format 2_6, and more specifically, by setting both a wake-up indication of 1 bit and an SCell dormancy indication of up to 5 bits to 0 bits and replacing a maximum of 6 bits with the PDCCH monitoring adaptation indication field.

When the PDCCH monitoring adaptation is configured to be indicated by the WUS (e.g., DCI format 2_6), if the UE misses the corresponding WUS (e.g., DCI format 2_6), the UE may start PDCCH monitoring at the next DRX cycle (without performing the PDCCH monitoring adaptation) as the default operation. The reason for this is that considering the periodic transmission of XR traffic, the UE may always expect to receive one or more PDCCHs during the DRX cycle and it may be undesirable for the UE not to monitor PDCCHs during the corresponding DRX cycle because the UE receives no WUS (e.g., DCI format 2_6).

[Method 1-3] Other DCI Formats

If the UE is allowed to monitor other DCI formats except for DCI format 2_6 within a WUS monitoring window out of the DRX active time, it may be possible to indicate the PDCCH monitoring adaptation in other DCI formats. Hereinafter, other DCI formats capable of being monitored within the WUS monitoring window except for DCI format 2_6 are referred to as "XR DCI".

(1) When XR DCI is Scheduling DCI

It may be considered that XR DCI is scheduling DCI. In general, since scheduling DCI is capable of being monitored based on a C-RNTI, it may be considered that XR DCI is also monitored based on the C-RNTI. Considering that when the UE is configured with the DRX operation, the UE is configured to control PDCCH monitoring within the DRX active time based on multiple RNTIs including the C-RNTI, a duration in which the XR DCI is monitored may also be defined as the DRX active time. In addition, since DCI format 2_6 is always monitored out of the DRX active time, monitoring of DCI format 2_6 may not be allowed during the duration in which the XR DCI is monitored. Therefore, a duration defined as the WUS monitoring window may be replaced with the DRX active time for XR DCI monitoring. For example, considering the periodic transmission of XR traffic, DCI format 2_6 may not need to be used as described in [Method 1-2]. In this case, the duration defined as the WUS monitoring window may be redefined as the DRX active time for XR DCI monitoring.

Therefore, the UE may start drx-onDurationTimer at the beginning of the original WUS monitoring window and expect to receive the XR DCI during the duration corresponding to the WUS monitoring window.

In addition, it may be expected that a minimum scheduling offset for the XR DCI is configured for the power saving effect of the UE. For example, when the UE receives DCI in slot n, the UE may receive a PDSCH (or PUSCH) in slot n+K0 (or slot n+K2). In this case, since the minimum value of K0 (or K2) is capable of being set to 0, the UE may need to decode the DCI as quickly as possible and perform buffering in the corresponding slot.

However, when K0 (or K2) is 0 or has a relatively small value, the power consumption of the UE may increase due to an increase in the load of decoding. Thus, the minimum value of K0 (or K2) may be configured by a minimum scheduling offset restriction (e.g., K0min or K2 min). In addition, the UE may expect that the PDSCH (or PUSCH) will not be scheduled in a slot earlier than slot n+K0min (or slot n+K2 min), and thus the UE may perform decoding slowly, or may not perform PDCCH monitoring or other receiving operations until slot n+K0min (or slot n+K2 min) after completing decoding quickly, thereby reducing the power consumption.

On the other hand, considering that in addition to the power saving, the expected time of receiving a packet is fixed except for the effect of jitter, the difference between the time of receiving XR DCI and the expected time of receiving a packet may be set to K0min. Accordingly, upon receiving XR DCI, the UE may perform decoding slowly until the UE receives a packet after the packet is scheduled to the UE or may not performing PDCCH monitoring or other receiving operations until slot n+K0min (or slot n+K2 min) after completing decoding quickly, thereby achieving the power saving effect. For example, to improve the power saving effect, the UE may not monitor any PDCCHs for a duration corresponding to K0 (or K0min).

The UE may monitor XR DCI based on other RNTIs other than the C-RNTI. As described above, since the C-RNTI is controlled by DRX functionality, a related monitoring duration needs to be set to the DRX active time in order to monitor the XR DCI based on the C-RNTI. Therefore, it may be considered to use a PS-RNTI, which is the RNTI used in the original WUS monitoring window, in order to monitor the XR DCI within the WUS monitoring window. In other words, the UE may monitor DCI format 2_6 and XR DCI within the WUS monitoring window based on the PS-RNTI. Since DCI that the UE is capable of monitoring is aligned such that there are three types of DCI for the C-RNTI and one type of DCI for the remaining RNTIs (e.g., PR-RNTI), it may be necessary to match the size of the XR DCI with DCI format 2_6. For example, up to four different DCI sizes may be configured for one cell. Among the four different DCI sizes, up to three DCI sizes may be configured for the C-RNTI. Therefore, since one DCI size is present for the remaining RNITs other than the C-RNTI, the size of the XR DCI may need to be equal to that of DCI format 2_6.

(2) When XR DCI is New DCI Format

XR DCI may be a DCI format newly designed in consideration of XR services. For example, the UE may use a PS-RNTI to monitor the XR DCI, or a new RNTI for the XR DCI (hereinafter referred to as an XR-RNTI) may be introduced. To this end, monitoring of the XR-RNTI other than the PS-RNTI may be allowed within the WUS monitoring window. In this case, the XR DCI monitored based on the XR-RNTI may have the same size as DCI format 2_6.

When the XR DCI is a new DCI format, the XR DCI may include an indication different from that in a WUS or scheduling DCI of the conventional NR standards. For example, the XR DCI may include only a simple PDCCH monitoring adaptation indication. For example, when the UE receives the WUS, the UE may be indicated whether the UE wakes up at the DRX cycle without changes in the NR standards. Additionally, only the PDCCH monitoring adaptation may be separately indicated by the XR DCI at the same or adjacent time point (e.g., after N symbols or slots). In this case, the application delay may be newly defined in consideration of a packet reception time.

Considering that the monitoring time of the XR DCI is earlier than the DRX active time and the UE monitors a PDCCH during the DRX active time, a method of monitoring the PDCCH within the DRX active time and the monitoring time may be indicated in advance by the XR DCI. For example, the XR DCI may provide the UE with information on how many ms or how many slots the UE needs to start monitoring the PDCCH after drx-onDurationTimer starts and information on an SS set index or a CORESET index to be monitored. The UE may be configured to perform blind decoding first for an SS set index associated with the indicated SS set index or CORESET index at a time (e.g., slot) when PDCCH reception is scheduled.

On the other hand, when the XR DCI is a new DCI format, the UE may be allowed to monitor a PDCCH in the DRX active time. In this case, the XR DCI may include an XR-specific monitoring adaptation indication. A different indication that does not overlap with the PDCCH monitoring adaptation indication in scheduling DCI may be allowed as in [Method 1-2]. In this case, the XR-RNTI may be configured to be controlled by DRX functionality, or the XR DCI may be configured to be always monitored the XR DCI, regardless of DRX. Alternatively, the UE may be configured to monitor the XR DCI based on the C-RNTI and controlled by DRX functionality.

According to [Method 1], PDCCH monitoring adaptation may be effectively used by indicating the PDCCH monitoring adaptation within the DRX active time or out of the DRX active time based on various DCI formats. In particular, for XR traffic that is periodically transmitted, various DCI formats and DCI transmission times may be determined in order to effectively indicate the PDCCH monitoring adaptation in consideration of the effect of jitter.

Figure 10:
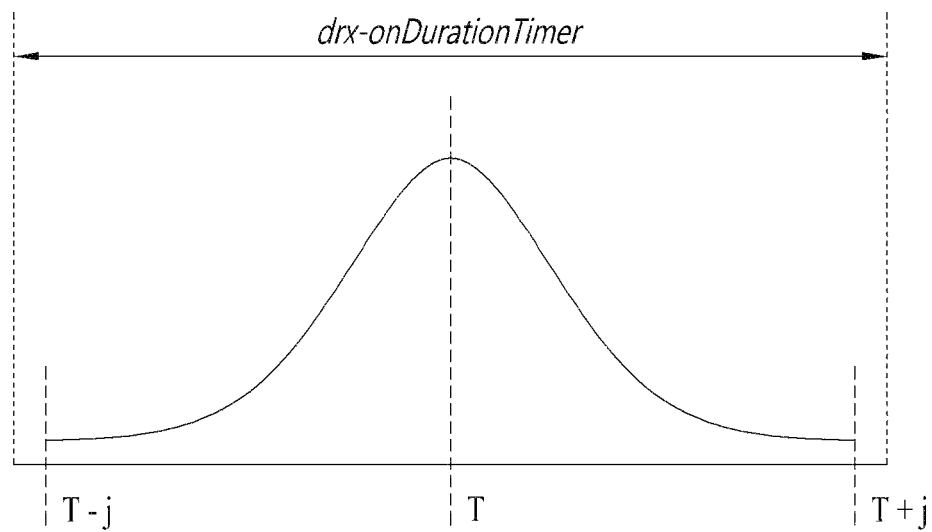
FIGS. 10 to 12 are diagrams for explaining a method of configuring physical downlink control channel (PDCCH) monitoring adaptation operation in consideration of jitter according to an embodiment of the present disclosure.

[Method 2] Method of Indicating PDCCH Monitoring Adaptation to UE Configured with DRX in Consideration of XR Traffic As described above, XR service traffic may occur periodically. Accordingly, the UE may expect that packets will be periodically received at fixed points in time. For example, if 60 FPS is required as the frame conversion rate for XR services, the packet reception period may be 16.6667 ms. That is, the UE may expect that a packet is received every 16.6667 ms. The UE may assume that drx-onDurationTimer is configured in consideration of the packet reception time and jitter. For example, as shown in FIG. 10, if the expected time of receiving the packet is T and the range of jitter is [−j, j], the range of packet reception times (e.g., expected packet reception time) may be expressed as [T−j, T+j]. For example, the probability of receiving the packet may be highest at T, and the probability of receiving the packet may gradually decrease as closer to T−j and/or T+j. In addition, the value of j may vary depending on the definition.

For example, jitter may converge to zero as it moves away from T, but jitter may not reach zero. Thus, the packet reception probability in consideration of jitter also converges to zero as it moves away from T, but the packet reception probability may not reach zero. Accordingly, a point at which the packet reception probability exceeds a certain level (e.g., a point at which the expected packet reception probability is determined to be significant) may be determined as j. For example, it is determined that the packet reception probability is not significant at points where the packet reception probability is less than X %, and thus the point at which the packet reception probability becomes X % may be determined as j.

In general, the range of jitter in a single stream DL traffic model may be given as [−4, 4] ms or [−5, 5] ms on the assumption that the pre-encoding delay is 10 ms to 20 ms and the packet reception period is 16.6667 ms. As shown in FIG. 10, drx-onDurationTimer may be configured to include all of the jitter range. For example, if the range of jitter is [−4, 4] ms or [−5, 5] ms, drx-onDurationTimer may be set to 8 ms or 10 ms. Alternatively, drx-onDurationTimer may be set to (8+a) ms or (10+a) ms in order to give a certain margin to the value of drx-onDurationTimer.

Meanwhile, the example described in [Method 2] is only for explanation, and [Method 2-1] and [Method 2-2] may be applied regardless of the size of drx-onDurationTimer.

[Method 2-1] PDCCH Monitoring Skipping Indication

The UE may receive a packet earlier or later than the fixed expected reception time T due to the effect of jitter. In addition, when the UE is indicated with PDCCH monitoring skipping, and when the UE stop PDCCH monitoring for a certain duration, the UE may expect the power saving effect. For example, if the BS is capable of predict the effect of jitter, the BS may instruct the UE to stop the PDCCH monitoring in some parts of the DRX active time and monitor a PDCCH only in the remaining parts through the PDCCH monitoring skipping indication, thereby maximizing the power saving effect.

(1) PDCCH Monitoring Skipping Indication in DCI within DRX Active Time

PDCCH monitoring adaptation within the DRX active time may be indicated by scheduling DCI as in [Method 1-1] or by a new DCI format as in [Method 1-3]. The UE may be instructed to perform PDCCH monitoring skipping for a certain duration after receiving a PDCCH from the BS. If the UE completes receiving DCI scheduling a packet without any problems, the UE may assume that there is no other DCI scheduling packets for a while (for example, during the rest of the DRX active time or on-duration after receiving the corresponding scheduling DCI). Therefore, the PDCCH monitoring after the UE receives the scheduling DCI may increase the power consumption. Thus, this operation may be assumed when the probability that a packet other than a packet for XR (e.g., packet for eMBB) is transmitted in the current DRX cycle is low or when no problem occurs even if the packet is transmitted in the next DRX cycle.

When the PDCCH monitoring skipping is indicated, if the packet is received earlier than the original expected time due to the effect of jitter, the power saving effect of the UE may be maximized. For example, when drx-onDurationTimer of the UE is configured in consideration of the range of jitter, if the packet is transmitted earlier due to jitter, the UE needs to be able to monitor the PDCCH even at the earlier point in time so that the UE is capable of receiving the packet correctly. Therefore, if the UE performs the PDCCH monitoring earlier than time T, which is the expected packet reception time when the UE has no jitter effect, the PDCCH transmission scheduling the packet may already be terminated at time T.

The PDCCH monitoring skipping may be indicated by DCI scheduling a packet as described in [Method 1-1]. For example, referring to FIG. 11(a), assuming that the time at which the UE actually receives DCI scheduling a packet due to the effect of jitter is T', the UE may monitor the DCI scheduling the packet at T'=T−j' (where j' denotes the absolute value of jitter that actually appears). The UE may receive the scheduled packet (e.g., PDSCH) in the same slot as a slot in which the corresponding scheduling DCI is received or in a slot after the corresponding slot. On the other hand, since a PDCCH monitoring adaptation indication included in the scheduling DCI received at time T is applied for a certain duration from a slot next to the slot in which time T is located, the UE may stop the PDCCH monitoring for the corresponding duration. In addition, if the application delay is applied, the UE may stop the PDCCH monitoring for a certain duration from a slot obtained by applying the application delay to the slot in which time T' is located. That is, when the UE monitors the PDCCH during the DRX active time and receives the PDCCH earlier than the expected reception time, T, the UE may be instructed not to monitor the PDCCH during the rest of the DRX active time, thereby expecting the power saving effect. On the other hand, as in [Method 1-3], a PDCCH monitoring skipping indication in the DRX active time may be received in DCI different from DCI scheduling a packet.

(2) PDCCH Monitoring Skipping Indication Before Reception of DCI Scheduling Packet PDCCH monitoring skipping may be indicated before the UE receives DCI scheduling a packet. For example, the PDCCH monitoring skipping may be indicated before the packet is scheduled by scheduling DCI as in [Method 1-1], a wake-up indication as in [Method 1-2], or a new DCI format as in [Method 1-3].

For example, the PDCCH monitoring skipping may be indicated by a WUS or XR DCI in the WUS monitoring window. Alternatively, the PDCCH monitoring skipping may be indicated by different DCI (, different scheduling DCI, new DCI, or non-scheduling DCI, etc.) before reception of DCI scheduling a packet within the DRX active time. On the other hand, when the PDCCH monitoring skipping is indicated before time T', the PDCCH monitoring skipping may be applied to a duration before time T' or a duration after time T.

When the PDCCH monitoring skipping is applied to the duration before time T', the power saving effect of the UE may be maximized if the packet reception is delayed than the originally expected time due to jitter. For example, when drx-onDurationTimer of the UE is configured in consideration of the range of jitter, even if the packet transmission is delayed due to jitter, the UE needs to be able to monitor the PDCCH even at the delayed time so that the UE is capable of receiving the packet correctly. For example, if the UE monitors the PDCCH (i.e., scheduling DCI scheduling a packet) later than T, which is the expected packet reception time when there is no jitter, that is, if the UE does not expect to receive the PDCCH scheduling the packet and does not monitor the PDCCH at time T, it may improve the power saving effect. For example, referring to FIG. 11(b), the UE may monitor the DCI scheduling the packet at time T'=T+j' and receive the scheduled packet (e.g., PDSCH) in the same slot as a slot in which the corresponding scheduling DCI is received or in a slot after the corresponding slot. On the other hand, if the UE is indicated with the PDCCH monitoring skipping by different DCI (e.g., different scheduling DCI, new DCI, or non-scheduling DCI) before time T, the UE may stop the PDCCH monitoring for a certain duration until a slot before the slot in which time T' is located. Alternatively, if the UE is indicated with the PDCCH monitoring skipping by different DCI (e.g., different scheduling DCI, new DCI, or non-scheduling DCI) before time T, the UE may stop the PDCCH monitoring for a certain duration from a slot obtained by applying the application delay to a slot in which the DCI is received to a slot before the slot in which time T' is located.

That is, when the UE monitors the PDCCH during the DRX active time and when the time at which the UE receives the PDCCH is delayed, the UE may be configured not to monitor the PDCCH for a duration before the time of receiving the PDCCH within the corresponding DRX active time, thereby expecting the power saving effect.

On the other hand, when it is indicated by a WUS or different DCI that the PDCCH monitoring skipping is performed after time T, the PDCCH monitoring skipping may be indicated before the UE receives the DCI scheduling the actual packet. Thus, the time for the PDCCH monitoring skipping indication may be different from the time at which the UE performs the PDCCH monitoring skipping. Therefore, as described above, a non-zero application delay needs to be configured, or a minimum scheduling offset restriction needs to be configured.

When the time at which the UE receives the PDCCH monitoring skipping indication is different from the time at which the UE actually applies the PDCCH monitoring skipping, if the UE monitors a PDCCH for new transmission or receives a new PDCCH monitoring skipping indication over the corresponding PDCCH (or other PDCCHs), it may be desirable for the UE to ignore the previous PDCCH monitoring skipping indication.

Alternatively, a PDCCH monitoring adaptation indication (e.g., PDCCH monitoring skipping) may be configured to be indicated together with the application delay and a PDCCH monitoring skipping duration. For example, when the PDCCH monitoring adaptation indication is configured as a pair of {application delay, skipping duration} and received in DCI, the UE may monitor the PDCCH during the application delay and stop monitoring the PDCCH for the PDCCH monitoring skipping duration after the application delay.

(3) Correlation Between PDCCH Monitoring Skipping Indication and DRX Timer

When the UE is indicated with PDCCH monitoring skipping, drx-InactivityTimer, which is another DRX timer configured for the UE, may be considered, where drx-InactivityTimer starts when DCI schedules new transmission rather than retransmission while the UE monitors the DCI. Assuming that drx-InactivityTimer is configured to have a relatively small value, it may be considered that the length of an indicated PDCCH monitoring skipping duration and the size of drx-InactivityTimer have a correlation, due to the characteristics of an XR service where it is expected that packets will be periodically received at fixed time points. It is assumed that a plurality of PDCCH monitoring skipping durations are capable of being configured, and each duration is set to be larger or smaller than drx-InactivityTimer. In this case, if a PDCCH monitoring skipping duration greater than drx-InactivityTimer is indicated, the UE may interpret it as an indication to end the current DRX cycle. That is, if the end of the PDCCH monitoring skipping is out of the DRX active time, the UE may interpret it as an indication to immediately end the current DRX cycle. On the other hand, if drx-InactivityTimer is relatively small and thus, the size thereof is smaller than the remaining time of drx-onDurationTimer, the UE may be configured to perform the PDCCH monitoring skipping only during drx-InactivityTimer.

[Method 2-2] SSSG Switching Indication

The UE may receive a packet at a time earlier or later than the expected fixed reception time, T due to the effect of jitter. When SSSG switching is indicated, the UE may reduce the number of times of PDCCH monitoring for a certain duration, thereby reducing the power consumption. For example, if it is difficult for the BS to predict jitter, the BS may instruct the UE to decrease the number of times of PDCCH monitoring in a duration with a low probability of receiving a packet within the DRX active time through an SSSG switching indication, thereby reducing the power consumption. On the other hand, the UE may increase the number of times of PDCCH monitoring in a duration with a high probability of receiving a packet to further increase the packet reception probability. In summary, the overall power saving effect may be improved by adjusting the number or times of PDCCH monitoring depending on the packet reception probability. In other words, the SSSG switching has the advantage of reducing the power consumption while maintaining the effect of DRX configured for the UE.

(1) Indication in DCI within DRX Active Time

PDCCH monitoring adaptation in the DRX active time may be indicated by scheduling DCI as in [Method 1-1] or by a new DCI format as in [Method 1-3].

The BS may instruct the UE to perform SSSG monitoring for a certain duration according to SSSG switching after receiving a PDCCH. If the UE completes receiving DCI scheduling a packet without any problems, the UE may assume that there is no other DCI scheduling packets for a while (for example, during the rest of the DRX active time or on-duration after receiving the corresponding scheduling DCI). Therefore, the PDCCH monitoring after the UE receives the scheduling DCI may increase the power consumption. Thus, this operation may be performed on the assumption that the probability that a packet other than a packet for XR (e.g., packet for eMBB) is transmitted in the current DRX cycle is low. However, since the UE may monitor the PDCCH at a relatively low frequency based on the SSSG switching, the UE may also receive packets other than packets for XR services with low power consumption.

On the other hand, the SSSG switching may be indicated in a similar way to PDCCH monitoring skipping. For example, due to the effect of jitter, the DRX active time may be maintained after a packet is actually received. The SSSG switching may be indicated to monitor the PDCCH sparsely during the corresponding duration. In addition, the corresponding SSSG switching may be indicated by DCI scheduling a packet for XR services as in [Method 1-1] or by different DCI within the DRX active time as in [Method 1-3].

Figure 11:
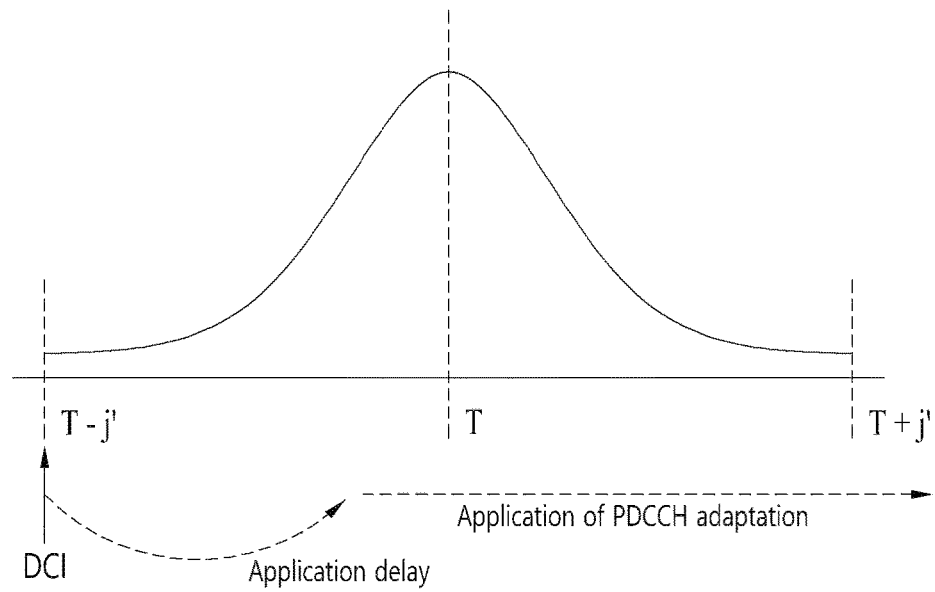
Figure 11:
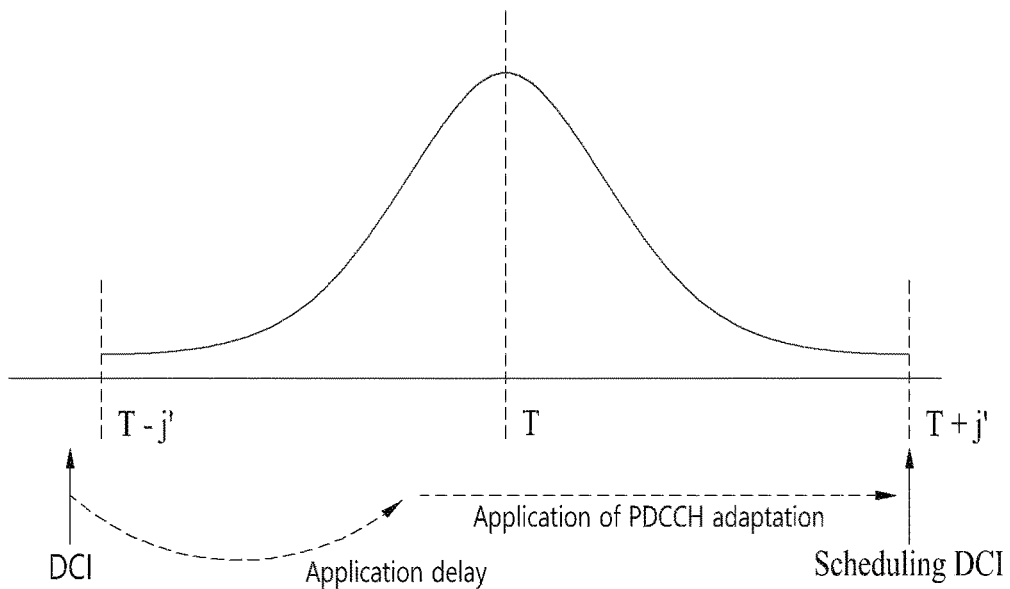

That is, due to the effect of jitter, the UE may monitor DCI scheduling a packet for XR services at time T' at which the DCI scheduling the corresponding packet is actually received. The UE may receive the scheduled packet (e.g., PDSCH) in the same slot as the slot in which the corresponding scheduling DCI is received or in a slot after the corresponding slot. The UE may perform the SSSG switching to monitor the PDCCH sparsely for a certain duration from a slot next to the slot in which time T is located according to a PDCCH monitoring adaptation indication obtained from the scheduling DCI received at time T'. When time T is T–j as shown in FIG. 11(a), if the UE monitors the PDCCH during the DRX active time and receives the PDCCH earlier, i.e., at time T–j, the UE may be configured to monitor the PDCCH fewer times (e.g., sparsely) during the rest of the DRX active time, thereby reducing the power consumption. As another example, when the BS determines that a packet other than a packet for XR services is highly likely to be scheduled, the BS may indicate the SSSG switching such that the UE densely monitor the PDCCH (2) SSSG Switching Indication Before Reception of DCI Scheduling Packet SSSG switching may be indicated before the UE receives DCI scheduling a packet. For example, the SSSG switching may be indicated before a packet is scheduled by scheduling DCI as in [Method 1-1], a wake-up indication as in [Method 1-2], or a new DCI format as in [Method 1-3].

For example, the SSSG switching may be indicated by a WUS or XR DCI within the WUS monitoring window. Alternatively, before reception of DCI scheduling a packet within the DRX active time, the SSSG switching may be indicated by different DCI (e.g., different scheduling DCI, new DCI, or non-scheduling DCI). On the other hand, when the SSSG switching is indicated before time T', the SSSG switching may be applied to a duration before time T' or a duration after time T'.

If it is difficult to know when a packet will be received because jitter is unpredictable, the operation of applying the SSSG switching during the duration before time T may reduce the power consumption of the UE by adjusting the number of times of PDCCH monitoring based on probability information. For example, if drx-onDurationTimer of the UE is configured in consideration of the range of jitter, it may be necessary to monitor the PDCCH throughout the entire duration of drx-onDurationTimer. However, considering that jitter appears based on the truncated Gaussian distribution and may have a range of [–j, j], the probability may be highest when jitter is 0, and the probability may decrease as jitter is closer to j (or –j). Therefore, an SSSG to be monitored may be configured based thereon.

Figure 12:
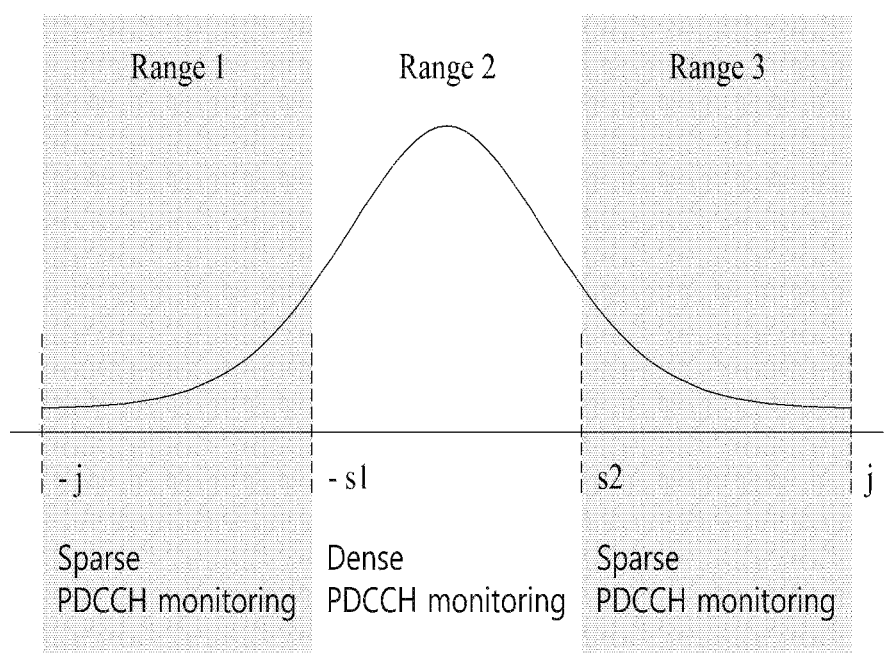

For example, as shown in FIG. 12, when jitter is divided into three ranges: [–j, –s1], [–s1, s2], and [s2, j], and when each is called range 1, range 2, and range 3, a range with the highest probability of occurrence of jitter among the three ranges is range 2. If the UE is configured with SSSG #0 as an SSSG for dense PDCCH monitoring (e.g., a larger number of times of PDCCH monitoring), and if the UE is configured with SSSG #1 as an SSSG for sparse PDCCH monitoring (e.g., a small number of times of PDCCH monitoring, the SSSG switching may be indicated such that the UE performs monitoring of SSSG #0 in range 2 and monitoring of SSSG #1 in range 1 and range 3.

If the UE is configured with three SSSGs, an SSSG suitable for each range may be configured based on the probability distribution for each range and the monitoring frequency of the SSSG. The above SSSG switching may be indicated by DCI within the WUS monitoring window or different DCI received before DCI scheduling a packet.

In the above-described example, the power saving effect may be expected by adjusting the number and/or frequency of times of PDCCH monitoring based on the actual probability distribution of packets depending on the jitter probability. In other words, switching to an SSSG for performing sparse PDCCH monitoring may be indicated for a range where the probability of occurrence of jitter is low, and switching to an SSSG for performing dense PDCCH monitoring may be indicated for a range where the probability of occurrence of jitter is high.

As another example, considering a packet delay budget (PDB) margin, switching from the SSSG for sparse PDCCH monitoring to the SSSG for dense PDCCH monitoring may be considered. The PDB indicates at which point in time traffic needs to be received depending on latency requirements of XR traffic. For example, the UE may monitor the SSSG for sparse PDCCH monitoring first, and then if the time at which the UE needs to receive XR traffic approaches, the UE may increase the number of times of PDCCH monitoring (i.e., dense PDCCH monitoring) to increase the reception probability of the corresponding traffic.

When it is indicated by a WUS or different DCI that SSSG switching is performed before T' (e.g., T–j) as shown in FIG. 11(b), the SSSG switching may be indicated before the UE receives DCI scheduling an actual packet. Thus, the time at which the SSSG switching is indicated may be different from the time at which the UE performs the SSSG switching. Therefore, it is necessary to configure an application delay different from that configured in the conventional NR standards.

When the application delay of the SSSG switching is different from that of the conventional NR standards, if the UE monitors a PDCCH for new transmission or receives a new SSSG switching indication on the corresponding PDCCH (or other PDCCHs) after receiving the SSSG switching indication, it may be desirable for the UE to ignore the previous SSSG switching indication.

Alternatively, a PDCCH monitoring adaptation indication (e.g., SSSG switching) may be configured to be indicated together with the application delay and an SSSG switching duration. For example, when the PDCCH monitoring adaptation indication is configured as a pair of {application delay, switching timer} and received in DCI, the UE may maintain current SSSG monitoring during the application delay and then start the indicated timer by switching to an indicated SSSG.

(3) Correlation Between SSSG Switching Indication and DRX Timer

When the UE is indicated with SSSG switching, drx-InactivityTimer, which is another DRX timer configured for the UE, may be considered, where drx-InactivityTimer starts when DCI schedules new transmission rather than retransmission while the UE monitors the DCI. Assuming that drx-InactivityTimer is configured to have a relatively small value, it may be considered that the length of an indicated SSSG switching timer and the size of drx-InactivityTimer have a correlation, due to the characteristics of an XR service where it is expected that packets will be periodically received at fixed time points. For example, only for a timer (e.g., drx-InactivityTimer) started by the corresponding DCI (or DCI received at a similar point in time to the corresponding DCI), an SSSG switching indication included in the corresponding DCI may be performed. For example, SSSG switching indicated by a WUS (or DCI received in the WUS monitoring window) may be performed only while drx-onDurationTimer is running, and SSSG switching indicated by DCI (e.g., scheduling DCI) received within the DRX active time may be performed only while drx-InactivityTimer is running. For a duration where drx-onDurationTimer and drx-InactivityTimer overlap, SSSG switching may be performed according to the Rel-17 NR standards.

According to [Method 2], when PDCCH monitoring adaptation is indicated to the UE in consideration of the characteristics of jitter and periodically transmitted XR traffic, the power consumption of the UE due to PDCCH monitoring may be reduced.

In particular, according to [Method 2-1], when PDCCH monitoring skipping is indicated in consideration of the range of jitter predicted when jitter is highly predictable, the power saving effect may be maximized.

On the other hand, according to [Method 2-2], when SSSG switching is indicated in consideration of an approximately predicted range of jitter when it is difficult to predict jitter beyond a certain level, sparse PDCCH monitoring may be performed in a range where jitter is expected to be low, PDCCH is monitored sparsely, and dense PDCCH monitoring may be performed in a range where jitter is expected to be high. Accordingly, it is possible to efficiently handle traffic transmission due to jitter while reducing the power consumption beyond a certain level.

[Method 3] Start Time of drx-onDurationTimer and Wake-Up Indication

In addition to PDCCH monitoring adaptation, a change in the start time of the DRX active time may be indicated by a WUS, all DCI capable of being received within the WUS monitoring window, or all DCI capable of being received at the same or similar time to the WUS. For convenience of description, the above-described operation is defined as delay. In addition, although [Method 3] has been described based on the WUS, the operations described below may be indicated by all DCIs capable of being received within the WUS monitoring window or all DCIs capable of being received at the same or similar time to the WUS.

(1) UE Operations

Whether the UE needs to wake up in a corresponding DRX cycle may be indicated to the UE by a WUS. In this case, the UE may be configured to wake up after a predetermined time without waking up at an original wake-up time.

For example, the BS may indicate through the WUS whether the UE needs to wake up at the scheduled time during the current DRX cycle or wake up later. Delayed wake-up may take into account the effect of jitter. Upon determining that there is no PDCCH transmission for packets of the UE when the BS transmits the WUS, the BS may indicate the delayed wake-up to the UE.

(2) Indication Method

In order to indicate a delayed DRX cycle (e.g., delayed wake-up), an offset may be configured in units of ms or slots. If the UE misses a WUS, the UE may wake up at the start time of the original DRX cycle. In this case, the delay (e.g., delayed wake-up) may mean that the UE starts drx-onDurationTimer later.

The offset may be configured in consideration of the range of jitter. The maximum numbers of offsets and the values of offsets, which may be indicated by the WUS, may be preconfigured. If the UE is configured with one offset, the UE may start drx-onDurationTimer later than the original start time by the offset (at the slot level).

The original start time and size of drx-onDurationTimer may be configured in consideration of the effect of jitter. For example, if the range of jitter is [−4, 4], the DRX cycle may be configured such that time T−4 is included in drx-onDurationTimer with respect to the expected time of receiving a packet, T. That is, the start time of the drx-onDurationTimer may be configured such that packets are normally received even when packets are transmitted earlier due to the effect of jitter. If the BS is capable of knowing that packets are transmitted later than time T−4 when transmitting a WUS, the BS may indicate the offset in the WUS. The UE may wake up based on the indicated offset without waking up at time T−4.

On the other hand, the DRX cycle may be advanced by the offset indicated by the WUS. This may be useful when the DRX cycle is configured in a different way from the above example. For example, when the DRX cycle of the UE is set to [T−2, T+2], and when the BS expects the packet transmission time to be T−3, the BS may instruct the UE to advance drx-onDurationTimer by 1 ms through the offset.

(3) Operation of DRX Timer after Indication of Delay

When a delay is indicated, a DRX timer may be maintained. In the case of drx-onDurationTimer, when a delay is indicated, drx-onDurationTimer may not change. For example, it is assumed that when there is no delay indication, drx-onDurationTimer starts from time t, continues for 10 ms, and ends at time t+10 ms. In this case, if a delay of 2 ms is indicated to the UE, drx-onDurationTimer starts at time t+2 and ends at time t+12 ms. Since drx-onDurationTimer is simply delayed, PDCCH monitoring adaptation within the DRX active time may be indicated together with a delay indication for power saving.

On the other hand, when a delay is indicated, a DRX timer may change. For example, when a delay is indicated, drx-onDurationTimer may decrease. For example, it is assumed that when a delay is indicated, drx-onDurationTimer starts from time t, continues for 10 ms, and ends at time t+10 ms.

In this case, if a delay of 2 ms is indicated, drx-onDurationTimer starts from time t+2 and ends at time t+10 ms. That is, drx-onDurationTimer may end at a fixed time, regardless of whether there is a delay indication. This may be considered similar to an operation in which the UE skips PDCCH monitoring for a certain duration based on a WUS simultaneously with the start of the DRX active time in terms of the PDCCH monitoring On the other hand, since drx-InactivityTimer starts based on reception of DCI for new transmission within the DRX active time, drx-InactivityTimer may not be affected by delays.

(4) Operation of Repeating Wake-Up and Sleep

When the UE fails to detect a PDCCH through monitoring after waking up (or waking up with a delay), the UE may be configured to perform a sleep operation, independently of an operation in which the UE is indicated with a delay and starts drx-onDurationTimer later. In this case, the duration of drx-onDurationTimer and sleep operation may be set to be relatively small.

In addition, the UE may repeat the operation of monitoring the PDCCH again by waking up again after sleep for a certain duration. Alternatively, the UE may receive a wake-up indication again after sleep for a certain duration. In this case, the wake-up indication may be a 1-bit indication indicating only whether the UE needs to wake up or may be a low-power signal in the form of a sequence. Also, depending on whether a WUS is supported for a delayed DRX cycle, it may be determined whether the UE continues sleep or repeats sleep and monitoring.

According to [Method 3], it is possible to adjust a time when OndurationTimer starts and perform wake-up and sleep operations in consideration of the periodic transmission of XR traffic and the features of jitter, thereby efficiently control the power consumption of the UE.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 13:
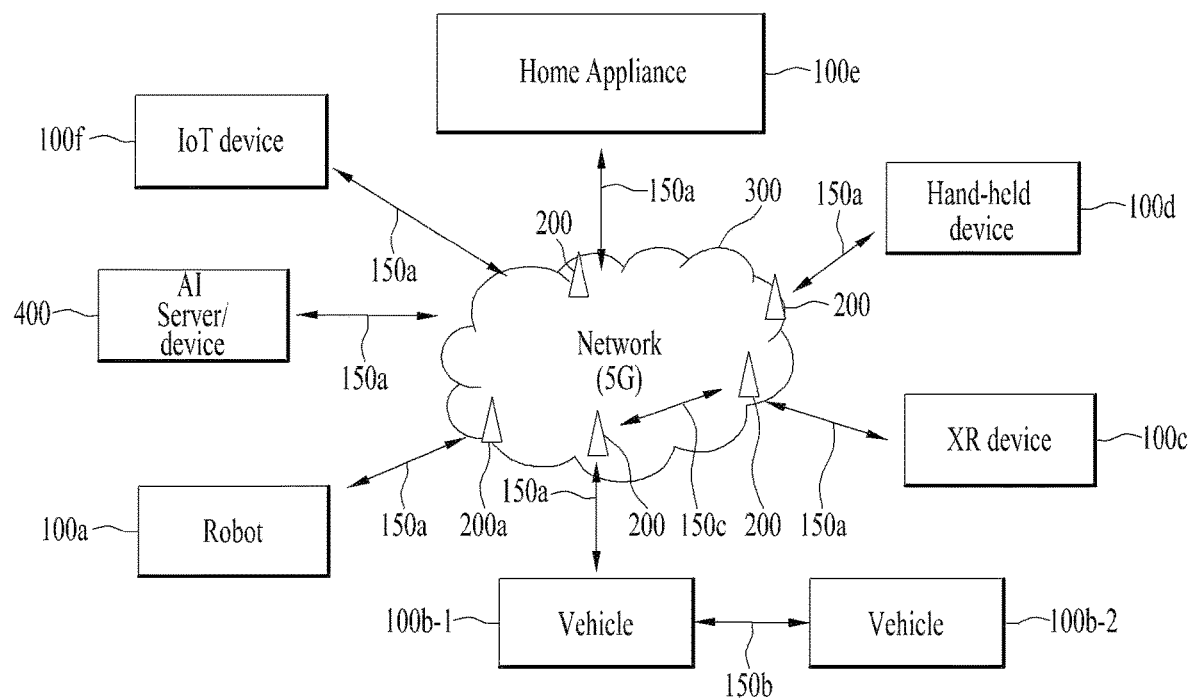
FIG. 13 illustrates an exemplary communication system applied to the present disclosure.

FIG. 13 illustrates a communication system 1 applied to the present disclosure.

Referring to FIG. 13, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 14:
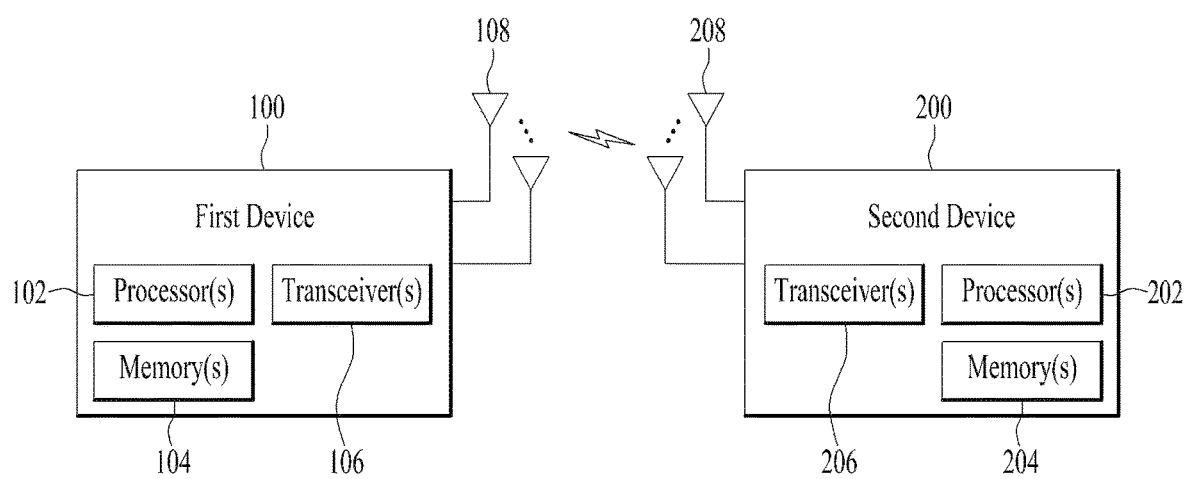
FIG. 14 illustrates an exemplary wireless device applicable to the present disclosure.

FIG. 14 illustrates wireless devices applicable to the present disclosure.

Referring to FIG. 14, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor(s) 102 of the first wireless device 100 and stored in the memory(s) 104 of the first wireless device 100, according to an embodiment of the present disclosure will now be described.

Although the following operations will be described based on a control operation of the processor(s) 102 in terms of the processor(s) 102, software code for performing such an operation may be stored in the memory 104. For example, in the present disclosure, the at least one memory(s) 104 may store instructions or programs as a computer-readable storage medium. The instructions or the programs may cause, when executed, at least one processor operably connected to the at least one memory to perform operations according to embodiments or implementations of the present disclosure, related to the following operations.

For example, the processor(s) 102 may transmit capability information to the BS through the transceiver(s) 106 in order to support the operations proposed in the present disclosure. For example, the capability information may include information on PDCCH monitoring adaptation (e.g., PDCCH monitoring skipping and SSSG switching) and information on whether delay is supported. However, transmitting the capability information may be omitted in a specific situation (e.g., when the BS already has the corresponding information or when each operation changes as needed by the BS). Alternatively, transmitting the capability information may be omitted when the corresponding process is not required.

The processor(s) 102 may receive first information for configuring PDCCH monitoring, which is transmitted by the BS, through the transceiver(s) 106 to support the operations proposed in the present disclosure. For example, the first information may be received in a higher layer signal (e.g., SIB or RRC signaling). For example, the first information may be to configure PDCCH monitoring adaptation or configure DCI monitoring in a PDCCH monitoring adaptation duration. In addition, the first information may be related to DRX and delay. Further, the first information may be configured in consideration of the capability of the processor(s) 102 and/or XR service support. For example, the first information may be to configure operations according to at least one of [Method 1] to [Method 3].

The processor(s) 102 may receive second information indicating the PDCCH monitoring adaptation and/or delay through the transceiver(s) 106 based on the first information configured by the higher layer signal. For example, the second information may be included in DCI. In addition, the corresponding DCI may be included in a PDCCH. For example, the PDCCH monitoring adaptation and/or delay indicated by the second information may be based on at least one of [Method 1] to [Method 3].

The processor(s) 102 may receive the PDCCH through the transceiver(s) 106 based on the second information. For example, the processor(s) 102 may perform the PDCCH monitoring adaptation and/or delay indicated by the second information. Accordingly, the processor(s) 102 may reduce the number of times of unnecessary PDCCH monitoring while normally receiving a scheduled packet, thereby reducing power consumption.

For example, the above-described operations of the processor(s) 102 may be based on at least one of [Method 1] to [Method 3].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 and stored in the memory 204 of the second wireless device 200, according to an embodiment of the present disclosure will now be described.

Although the following operations will be described based on a control operation of the processor 202 in terms of the processor 202, software code for performing such an operation may be stored in the memory 204. For example, in the present disclosure, the at least one memory 204 may store instructions or programs as a computer-readable storage medium. The instructions or the programs may cause, when executed, at least one processor operably connected to the at least one memory to perform operations according to embodiments or implementations of the present disclosure, related to the following operations.

For example, the processor(s) 202 may receive capability information from the UE through the transceiver(s) 206 to support the operations proposed in the present disclosure.

For example, the capability information may include information on PDCCH monitoring adaptation (e.g., PDCCH monitoring skipping and SSSG switching) and information on whether delay is supported. However, receiving the capability information may be omitted in a specific situation (e.g., when the BS already has the corresponding information or when each operation changes as needed by the BS). Alternatively, receiving the capability information may be omitted when the corresponding process is not required.

The processor(s) 202 may transmit first information for configuring PDCCH monitoring through the transceiver(s) 206 to support the operations proposed in the present disclosure. For example, the first information may be transmitted in a higher layer signal (e.g., SIB or RRC signaling). For example, the first information may be to configure PDCCH monitoring adaptation or configure DCI monitoring in a PDCCH monitoring adaptation duration. In addition, the first information may be related to DRX and delay. Further, the first information may be configured in consideration of UE capability and/or XR service support. For example, the first information may be to configure operations according to at least one of [Method 1] to [Method 3].

The processor(s) 202 may transmit second information indicating the PDCCH monitoring adaptation and/or delay through the transceiver(s) 206 based on the first information configured by the higher layer signal. For example, the second information may be included in DCI. In addition, the corresponding DCI may be included in a PDCCH. For example, the PDCCH monitoring adaptation and/or delay indicated by the second information may be based on at least one of [Method 1] to [Method 3].

The processor(s) 202 may transmit the PDCCH through the transceiver(s) 206 based on the second information. For example, the processor(s) 202 may transmit the PDCCH based on the PDCCH monitoring adaptation and/or delay indicated by the second information.

For example, the above-described operations of the processor(s) 202 may be based on at least one of [Method 1] to [Method 3].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 15:
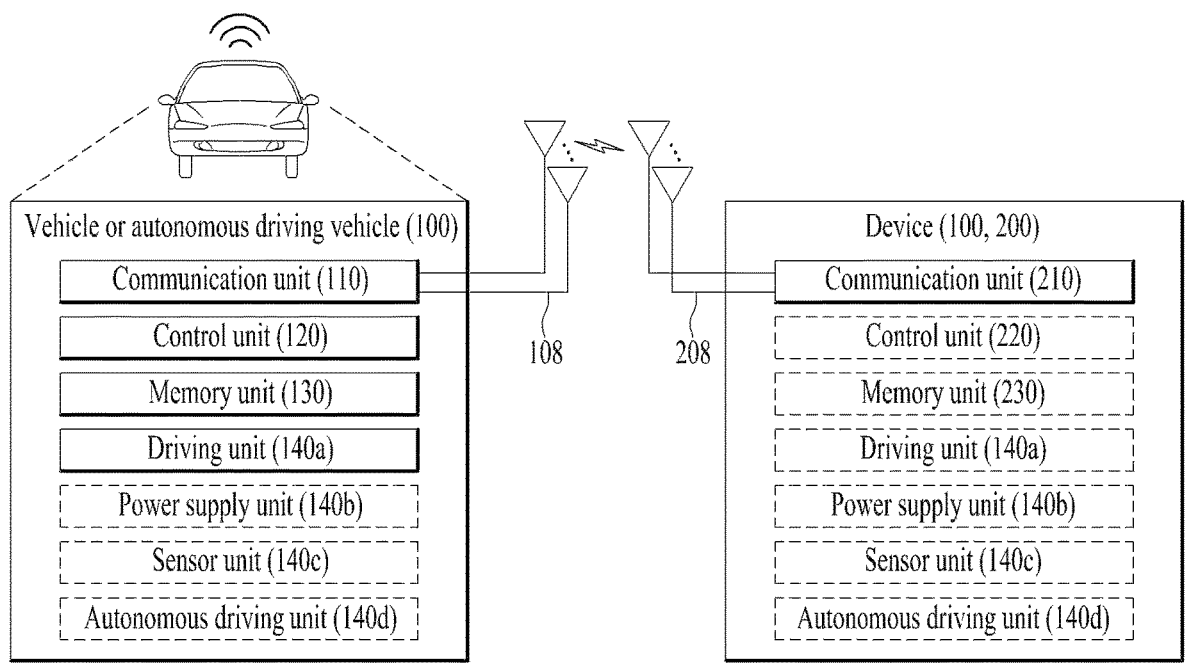
FIG. 15 illustrates an exemplary vehicle or autonomous driving vehicle applicable to the present disclosure.

FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 16:
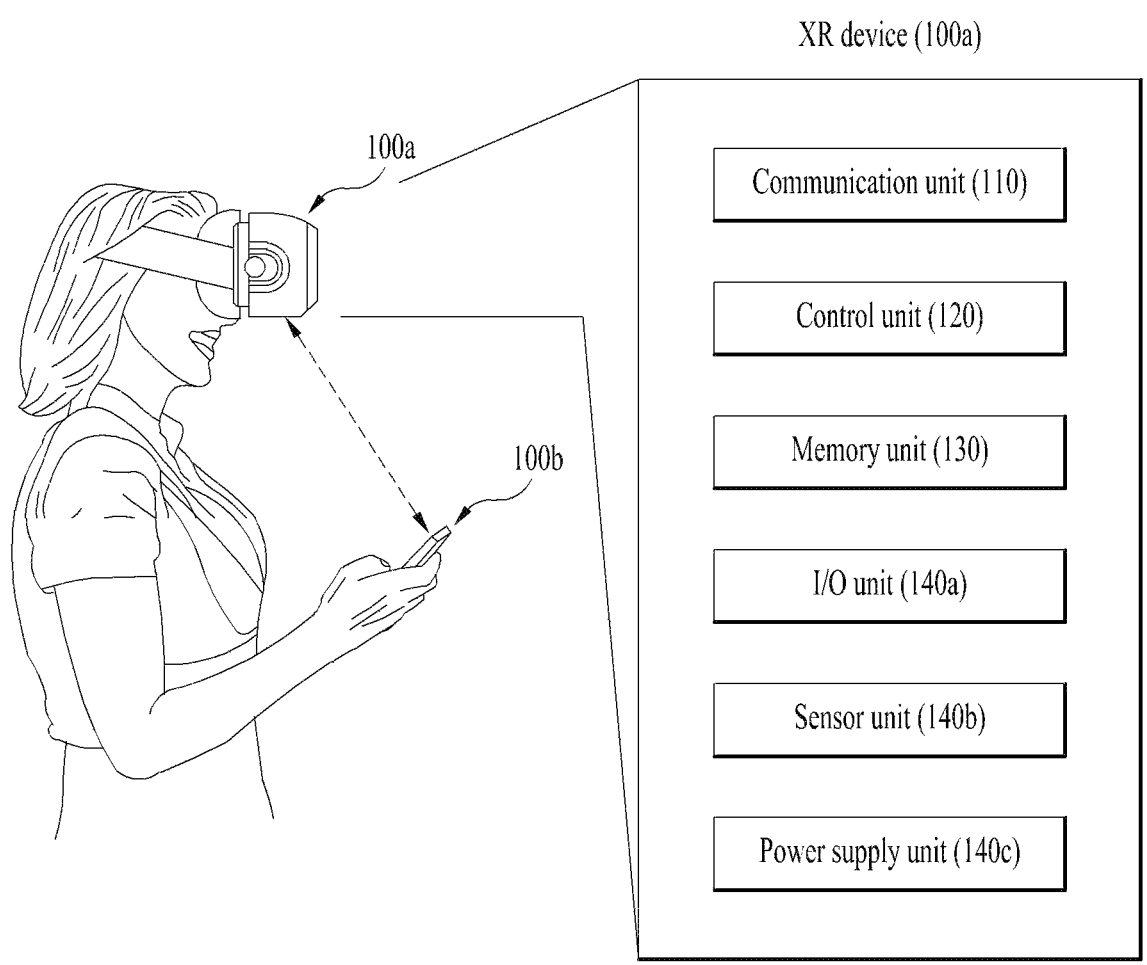
FIG. 16 illustrates an extended reality (XR) device applicable to the present disclosure.

FIG. 16 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 16, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 16, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As is apparent from the above description, the present disclosure has effects as follows.

According to the present disclosure, when a UE supporting XR receives a packet periodically, the UE may skip unnecessary PDCCH monitoring, thereby reducing power consumption.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

What is claimed is:

1. A method performed by a user equipment (UE), the method comprising:
   receiving a parameter related to discontinuous reception (DRX) operation through a higher layer;
   receiving first downlink control information (DCI) comprising information related to physical downlink control channel (PDCCH) monitoring adaptation;
   receiving second DCI for scheduling a physical downlink shared channel (PDSCH) within a DRX active time of the DRX operation, based on the PDCCH monitoring adaptation; and
   receiving the PDSCH based on the second DCI,
   wherein the UE determines a starting point of a time duration in which the PDCCH monitoring adaptation is performed, based on whether the first DCI is configured as a wake-up signal (WUS).

2. The method of claim 1, wherein the first DCI is received out of the DRX active time.

3. The method of claim 1, wherein monitoring of the second DCI is skipped from slot (N+1) to slot (N+n) based on the PDCCH monitoring adaptation,
   wherein the first DCI is received in slot N, and
   wherein n is determined based on jitter related to the PDSCH.

4. The method of claim 1, wherein based on the PDCCH monitoring adaptation, the second DCI is monitored (i) in a first duration from slot (M-m) to slot M and a second duration from slot X to slot (X+m) based on a first search space set group (SSSG); and (ii) in a third duration from slot M to slot X based on a second SSSG,
   wherein M, X, and m are determined based on jitter related to the PDSCH, and
   wherein the first SSSG and the second SSSG have different PDCCH monitoring periodicities.

5. The method of claim 1, wherein the first DCI further comprises information for delaying a start of the DRX active time.

6. The method of claim 1, wherein the PDSCH carries a packet for an extended reality (XR) service.

7. The method of claim 1, wherein based on the first DCI being configured as the WUS, the time duration is not started until a start of a timer related to the DRX active time.

8. The method of claim 1, wherein a length of the time duration is determined based on jitter related to the PDSCH.

9. A user equipment (UE) comprising:
   at least one transceiver;
   at least one processor; and
   at least one memory operably connected to the at least one processor and configured to store instructions that, when executed, cause the at least one processor to perform operations comprising:
   receiving, through the at least one transceiver, a parameter related to discontinuous reception (DRX) operation through a higher layer;
   receiving, through the at least one transceiver, first downlink control information (DCI) comprising information related to physical downlink control channel (PDCCH) monitoring adaptation;
   receiving, through the at least one transceiver, second DCI for scheduling a physical downlink shared channel (PDSCH) within a DRX active time of the DRX operation, based on the PDCCH monitoring adaptation; and
   receiving, through the at least one transceiver, the PDSCH based on the second DCI,
   wherein the UE determines a starting point of a time duration in which the PDCCH monitoring adaptation is performed, based on whether the first DCI is configured as a wake-up signal (WUS).

10. The UE of claim 9, wherein the first DCI is received out of the DRX active time.

11. The UE of claim 9, wherein monitoring of the second DCI is skipped from slot (N+1) to slot (N+n) based on the PDCCH monitoring adaptation,
wherein the first DCI is received in slot N, and
wherein n is determined based on jitter related to the PDSCH.

12. The UE of claim 9, wherein based on the PDCCH monitoring adaptation, the second DCI is monitored (i) in a first duration from slot (M-m) to slot M and a second duration from slot X to slot (X+m) based on a first search space set group (SSSG); and (ii) in a third duration from slot M to slot X based on a second SSSG,
wherein M, X, and m are determined based on jitter related to the PDSCH, and
wherein the first SSSG and the second SSSG have different PDCCH monitoring periodicities.

13. The UE of claim 9, wherein the first DCI further comprises information for delaying a start of the DRX active time.

14. The UE of claim 9, wherein the PDSCH carries a packet for an extended reality (XR) service.

15. A base station comprising:
at least one transceiver;
at least one processor; and
at least one memory operably connected to the at least one processor and configured to store instructions that, when executed, cause the at least one processor to perform operations comprising:
transmitting, to a user equipment (UE) through the at least one transceiver, a parameter related to discontinuous reception (DRX) operation through a higher layer;
transmitting, to the UE through the at least one transceiver, first downlink control information (DCI) comprising information related to physical downlink control channel (PDCCH) monitoring adaptation;
transmitting, to the UE through the at least one transceiver, second DCI for scheduling a physical downlink shared channel (PDSCH) within a DRX active time of the DRX operation, based on the PDCCH monitoring adaptation of the UE; and
transmitting, through the at least one transceiver, the PDSCH based on the second DCI,
wherein the BS determines a starting point of a time duration in which the PDCCH monitoring adaptation of the UE is performed, based on whether the first DCI is configured as a wake-up signal (WUS).

* * * * *